US012476478B2

United States Patent
Tomizawa et al.

(10) Patent No.: US 12,476,478 B2
(45) Date of Patent: Nov. 18, 2025

(54) BATTERY CHARGE/DISCHARGE TESTING DEVICE AND BATTERY DISCHARGE POWER CONTROL METHOD

(71) Applicant: TOYO SYSTEM CO., LTD., Iwaki (JP)

(72) Inventors: Yutaka Tomizawa, Fukushima (JP); Hideki Shoji, Fukushima (JP)

(73) Assignee: TOYO SYSTEM CO., LTD., Fukushima (JP)

( * ) Notice: Subject to any disclaimer, the term of this patent is extended or adjusted under 35 U.S.C. 154(b) by 576 days.

(21) Appl. No.: 18/013,196

(22) PCT Filed: Feb. 24, 2022

(86) PCT No.: PCT/JP2022/007724
§ 371 (c)(1),
(2) Date: Dec. 27, 2022

(87) PCT Pub. No.: WO2022/249601
PCT Pub. Date: Dec. 1, 2022

(65) Prior Publication Data
US 2023/0253815 A1     Aug. 10, 2023

(30) Foreign Application Priority Data
May 24, 2021  (JP) ................. 2021-087271

(51) Int. Cl.
*H02J 7/00* (2006.01)
*H02M 1/08* (2006.01)
*H02M 3/158* (2006.01)

(52) U.S. Cl.
CPC ......... *H02J 7/007182* (2020.01); *H02M 1/08* (2013.01); *H02M 3/158* (2013.01); *H02J 2207/20* (2020.01)

(58) Field of Classification Search
None
See application file for complete search history.

(56) References Cited

U.S. PATENT DOCUMENTS

| 7,498,769 B1 | 3/2009 | Potanin et al. |
| 9,312,770 B2 | 4/2016 | Tomizawa et al. |

(Continued)

FOREIGN PATENT DOCUMENTS

| CN | 101421902 A | 4/2009 |
| CN | 104917269 A | 9/2015 |

(Continued)

OTHER PUBLICATIONS

Extended European Search Report (EESR) dated Dec. 9, 2024, issued in European Application No. 22812406.1 (which is a counterpart of related U.S. Appl. No. 18/013,177).

(Continued)

*Primary Examiner* — Arun C Williams
(74) *Attorney, Agent, or Firm* — Holtz, Holtz & Volek PC

(57) ABSTRACT

The battery charge/discharge testing device includes a sub-charge/discharge unit connected to a main charge/discharge unit through bus lines, wherein when an output voltage of a built-in battery in the sub-charge/discharge unit is in a voltage range capable of supplying power, sub-power supply control is executed to supply discharge power of a built-in battery between the bus lines through a full-bridge circuit in a sub-DC/DC conversion unit by duty-ratio controlling ON/OFF of switching elements of the full-bridge circuit so that the voltage between the bus lines becomes a first predetermined voltage value. When the voltage exceeds the first predetermined voltage value during the sub-power supply control, the control is stopped, and constant current charge control is executed to charge the built-in battery through the full-bridge circuit by using, as a power supply, discharge power of the test battery supplied between the bus (Continued)

lines by duty-ratio controlling ON/OFF of the switching elements.

7 Claims, 15 Drawing Sheets

(56) References Cited

U.S. PATENT DOCUMENTS

| | | | |
|---|---|---|---|
| 9,716,403 | B2 | 7/2017 | Ball |
| 10,320,225 | B2 | 6/2019 | Tian et al. |
| 10,574,075 | B2 | 2/2020 | Gekinozu |
| 11,095,219 | B2 * | 8/2021 | Watanabe ......... H02M 3/33546 |
| 2006/0028188 | A1 | 2/2006 | Hartular et al. |
| 2008/0258687 | A1 | 10/2008 | So et al. |
| 2008/0259646 | A1 * | 10/2008 | Moussaoui ....... H02M 3/33507 363/17 |
| 2009/0309547 | A1 | 12/2009 | Nakatsuji |
| 2012/0086406 | A1 | 4/2012 | Maeagawa |
| 2014/0062396 | A1 | 3/2014 | Reddy |
| 2014/0133206 | A1 | 5/2014 | Shoji et al. |
| 2015/0145491 | A1 | 5/2015 | Tomizawa et al. |
| 2015/0168967 | A1 | 6/2015 | Halder et al. |
| 2015/0263638 | A1 | 9/2015 | Yang |
| 2016/0105042 | A1 | 4/2016 | Taylor et al. |
| 2016/0181925 | A1 * | 6/2016 | Chiang ............. H02M 3/33584 363/17 |
| 2016/0276844 | A1 | 9/2016 | Gekinozu |
| 2016/0336873 | A1 * | 11/2016 | Ayai ................. H02M 3/33576 |
| 2020/0259338 | A1 | 8/2020 | Taylor et al. |

FOREIGN PATENT DOCUMENTS

| | | | |
|---|---|---|---|
| CN | 105207328 | A | 12/2015 |
| JP | H06141475 | A | 5/1994 |
| JP | 7123597 | A | 5/1995 |
| JP | 2006121873 | A | 5/2006 |
| JP | 2008035620 | A | 2/2008 |
| JP | 2011080966 | A | 4/2011 |
| JP | 2012105467 | A | 5/2012 |
| JP | 2012161240 | A | 8/2012 |
| JP | 2013243874 | A | 12/2013 |
| JP | 2014102890 | A | 6/2014 |
| JP | 2014220896 | A | 11/2014 |
| JP | 2015045553 | A | 3/2015 |
| JP | 2015116122 | A | 6/2015 |
| JP | 2015122943 | A | 7/2015 |
| JP | 2020184880 | A | 11/2020 |
| JP | 2021027749 | A | 2/2021 |
| JP | 2021035286 | A | 3/2021 |
| JP | 2021158768 | A | 10/2021 |

OTHER PUBLICATIONS

Extended European Search Report (EESR) dated Nov. 24, 2023 in European Application No. 21890362.3, which is a European counterpart of related U.S. Appl. No. 17/778,070.
International Search Report (ISR) (and English translation thereof) dated Apr. 19, 2022, issued in International Application No. PCT/JP2022/007724.
Written Opinion dated Apr. 19, 2022, issued in International Application No. PCT/JP2022/007724.
Canadian Office Action dated May 27, 2024, issued in Canadian Application No. 3,182,392, which is a Canadian counterpart of related U.S. Appl. No. 18/013,177.
International Search Report (ISR) dated Apr. 19, 2022, issued in International Application No. PCT/JP2022/007741.
Written Opinion dated Apr. 19, 2022, issued in International Application No. PCT/JP2022/007741.
International Search Report re PCT/JP2021/036463 mailed Nov. 30, 2021 (8 pages).
Related U.S. Appl. No. 17/778,070, filed May 19, 2022.
Related U.S. Appl. No. 18/013,177, filed Dec. 27, 2022.
Notice of Allowance dated May 17, 2024, issued in related U.S. Appl. No. 17/778,070.
Notice of Allowance dated Sep. 11, 2025, issued in related U.S. Appl. No. 18/013,177.
Jiang, et al., "Evaluation of Acceptable Charging Current of Power Li-Ion Batteries Based on Polarization Characteristics", IEEE Transactions on Industrial Electronics, vol. 61, No. 12, pp. 6844-6851, Dec. 2014.

* cited by examiner

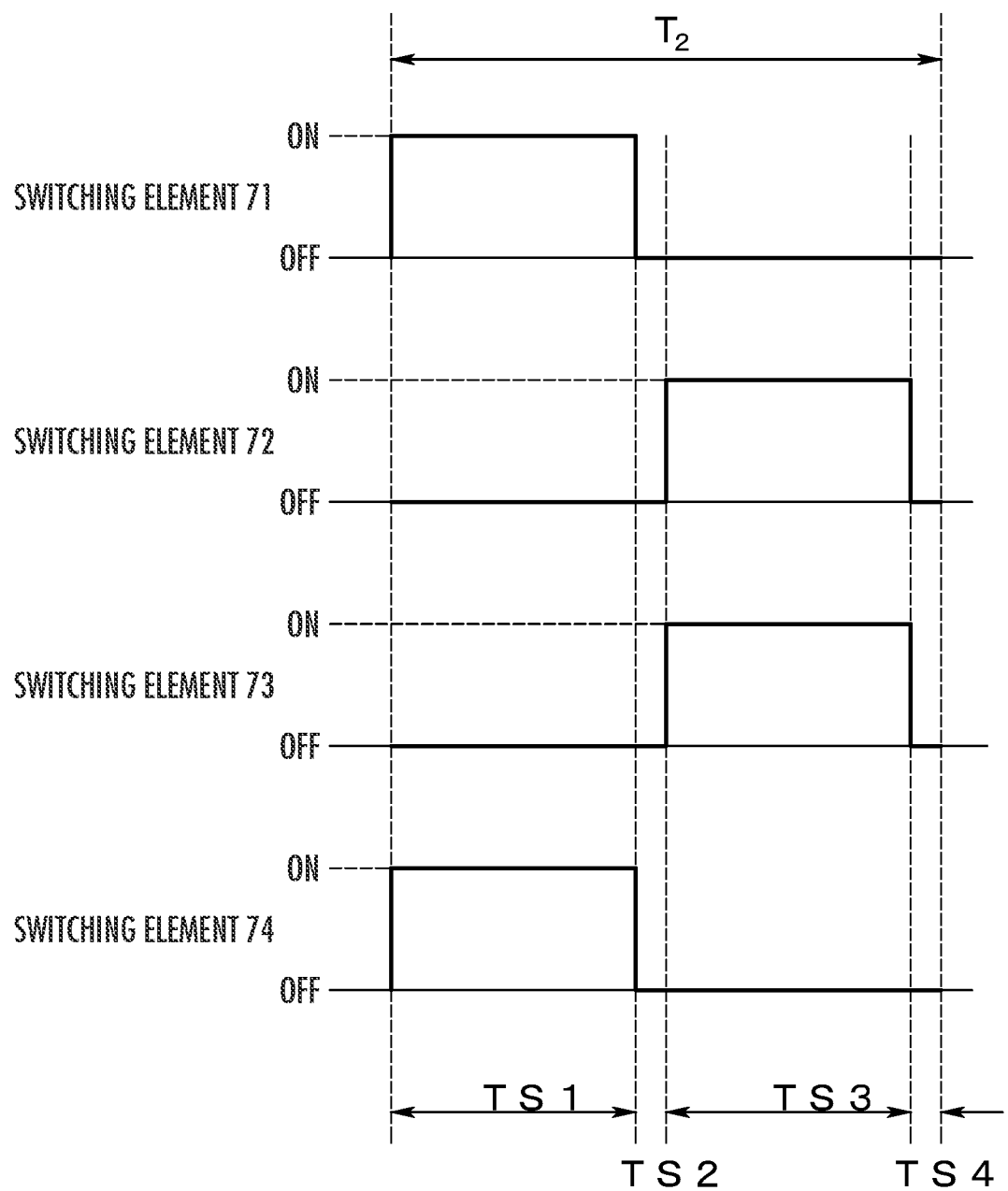

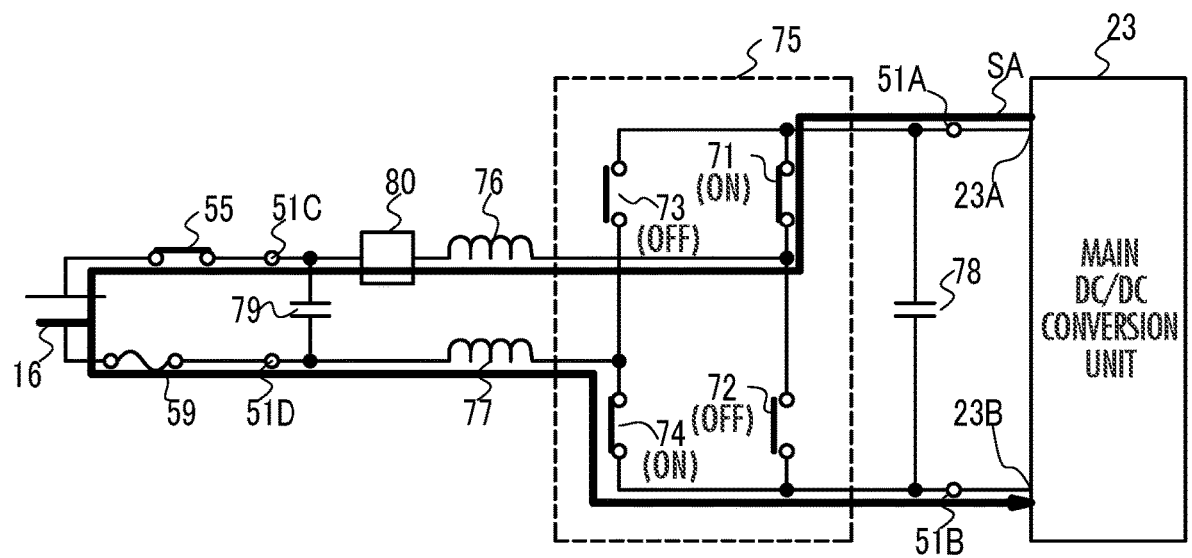
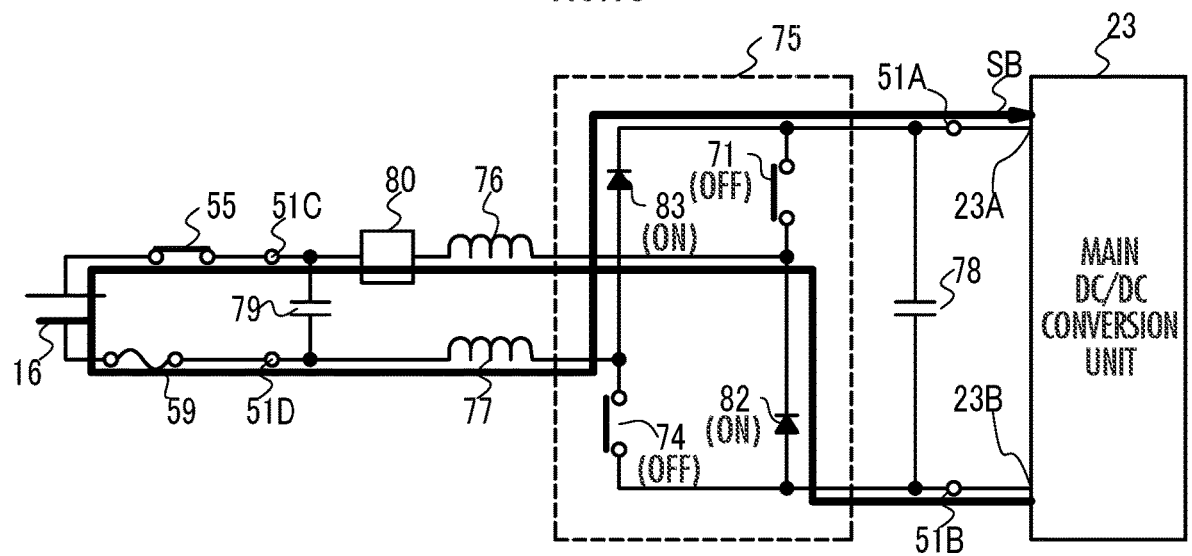

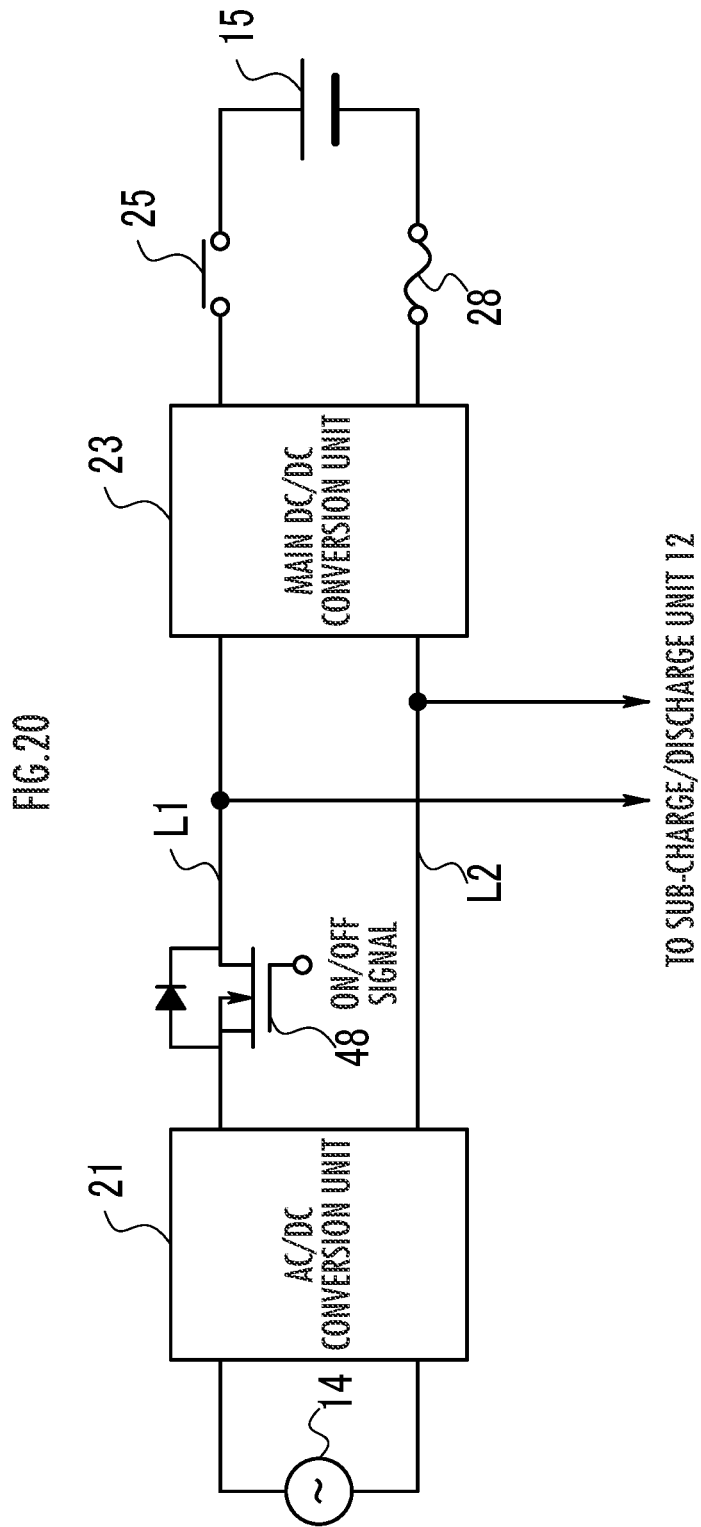

BATTERY CHARGE/DISCHARGE TESTING DEVICE AND BATTERY DISCHARGE POWER CONTROL METHOD

TECHNICAL FIELD

The present invention relates to a battery charge/discharge testing device and a battery discharge power control method for controlling battery charging and discharging for the purpose of a battery characteristic test.

BACKGROUND ART

A battery charge/discharge testing device is to measure the charge/discharge characteristics of a test battery to be tested by performing charging operation and discharging operation, respectively. During each of the charging operation and the discharging operation, for example, the voltage and charging/discharging current of the test battery are measured over time to obtain the charge/discharge characteristics of the test battery.

As the battery charge/discharge testing device, there is a device using a bidirectional DC-DC converter as disclosed in Patent Literature 1. The bidirectional DC-DC converter is composed of a full-bridge circuit in which four switching elements are bridge-connected. A DC power supply is connected to one terminal of the bidirectional DC-DC converter, and a battery is connected to the other terminal through a choke coil. ON/OFF of each of the switching elements of the bidirectional DC-DC converter is duty-ratio controlled by a control unit in a predetermined cycle. During the charging operation, a charging current is supplied from the DC power supply to the battery through the full-bridge circuit of the bidirectional DC-DC converter and then the choke coil to charge the test battery. In the discharging operation, when power regeneration is dealt with by a self-regeneration method, a discharging current from the battery is supplied to a circuit on the DC power supply side through the choke coil and then the full-bridge circuit of the bidirectional DC-DC converter to consume discharge power in the circuit on the DC power supply side.

CITATION LIST

Patent Literature

Patent Literature 1: Japanese Patent Application Laid-Open No. 2015-122943

SUMMARY OF INVENTION

Technical Problem

However, there have recently been demands for high-current specifications of battery charge/discharge testing devices, and when power regeneration is dealt with by the self-regeneration method, discharge power that cannot be consumed for cable losses, a control power supply, and a cooling fan is forced to be consumed in a discharge circuit, resulting in wasted power consumption.

Therefore, it is an object of the present invention to provide a battery charge/discharge testing device and a battery discharge power control method capable of efficiently using discharge power generated as regenerative power during discharging operation of a test battery.

Solution to Problem

A battery charge/discharge testing device of the present invention includes: a DC power supply unit which outputs a constant DC voltage between two bus lines; a main DC/DC conversion unit including a first full-bridge circuit composed of a plurality of switching elements and having two first input terminals and two first output terminals, where the two bus lines are connected to the two first input terminals, respectively, and the positive terminal and negative terminal of a test battery are connected to the two first output terminals, respectively; a main charge/discharge control unit which duty-ratio controls ON/OFF of each of the plurality of switching elements of the first full-bridge circuit in a first cycle to supply a charging current to the test battery through the first full-bridge circuit in a charge test mode so as to charge the test battery and to discharge stored charge of the test battery in a discharge test mode through the first full-bridge circuit so as to supply discharge power of the test battery between the two bus lines; a sub-DC/DC conversion unit including a second full-bridge circuit composed of a plurality of switching elements and having two second input terminals and two second output terminals, where the two bus lines are connected to the two second input terminals, respectively, and the positive terminal and negative terminal of a built-in battery are connected to the two second output terminals, respectively; and a sub-charge/discharge control unit which duty-ratio controls ON/OFF of each of the plurality of switching elements of the second full-bridge circuit in a second cycle to perform charging and discharging of the built-in battery, wherein when an output voltage of the built-in battery is in a voltage range capable of supplying power, the sub-charge/discharge control unit executes sub-power supply control to supply discharge power of the built-in battery between the two bus lines through the second full-bridge circuit by duty-ratio control of the second cycle so that the voltage between the bus lines becomes a first predetermined voltage value higher than a constant voltage value of the DC voltage, and when the voltage between the bus lines drops to the constant voltage value of the DC voltage or less during the execution of the sub-power supply control, the sub-charge/discharge control unit stops the sub-power supply control, or when the voltage between the bus lines exceeds the first predetermined voltage value during the execution of the sub-power supply control, the sub-charge/discharge control unit stops the sub-power supply control and executes constant current charge control to charge the built-in battery through the second full-bridge circuit by using, as a power supply, discharge power of the test battery supplied between the two bus lines by the duty-ratio control of the second cycle, and when the voltage between the bus lines drops to a second predetermined voltage value or less during the execution of the constant current charge control, where the second predetermined voltage value is higher than the constant voltage value of the DC voltage and lower than the first predetermined voltage value, the sub-charge/discharge control unit stops the constant current charge control.

A battery discharge power control method of the present invention is a battery discharge power control method for a battery charge/discharge testing device including: a DC power supply unit which outputs a constant DC voltage between two bus lines; a main DC/DC conversion unit including a first full-bridge circuit composed of a plurality of switching elements and having two first input terminals and two first output terminals, where the two bus lines are connected to the two first input terminals, respectively, and the positive terminal and negative terminal of a test battery are connected to the two first output terminals, respectively; a main charge/discharge control unit which duty-ratio controls ON/OFF of each of the plurality of switching elements of the first full-bridge circuit in a first cycle to supply a charging current to the test battery through the first full-bridge circuit in a charge test mode so as to charge the test battery and to discharge stored charge of the test battery in a discharge test mode through the first full-bridge circuit so as to supply discharge power of the test battery between the two bus lines; a sub-DC/DC conversion unit including a second full-bridge circuit composed of a plurality of switching elements and having two second input terminals and two second output terminals, where the two bus lines are connected to the two second input terminals, respectively, and the positive terminal and negative terminal of a built-in battery are connected to the two second output terminals, respectively; and a sub-charge/discharge control unit which duty-ratio controls ON/OFF of each of the plurality of switching elements of the second full-bridge circuit in a second cycle to perform charging and discharging of the built-in battery, the battery discharge power control method including: a step in which when an output voltage of the built-in battery is in a voltage range capable of supplying power, the sub-charge/discharge control unit executes sub-power supply control to supply discharge power of the built-in battery between the two bus lines through the second full-bridge circuit by duty-ratio control of the second cycle so that the voltage between the bus lines becomes a first predetermined voltage value higher than a constant voltage value of the DC voltage, and when the voltage between the bus lines drops to the constant voltage value of the DC voltage or less during the execution of the sub-power supply control, the sub-charge/discharge control unit stops the sub-power supply control; and a step in which when the voltage between the bus lines exceeds the first predetermined voltage value during the execution of the sub-power supply control, the sub-charge/discharge control unit stops the sub-power supply control and executes constant current charge control to charge the built-in battery through the second full-bridge circuit by using, as a power supply, discharge power of the test battery supplied between the two bus lines by the duty-ratio control of the second cycle, and when the voltage between the bus lines drops to a second predetermined voltage value or less during the execution of the constant current charge control, where the second predetermined voltage value is higher than the constant voltage value of the DC voltage and lower than the first predetermined voltage value, the sub-charge/discharge control unit stops the constant current charge control.

According to the battery charge/discharge testing device and the battery discharge power control method, since discharge power obtained from the main DC/DC conversion unit in the discharge test mode is stored in the built-in battery, and the stored power of the built-in battery is supplied to the main DC/DC conversion unit as a charging power supply in the charge test mode, the discharge power can be used efficiently.

BRIEF DESCRIPTION OF DRAWINGS

FIG. 11 is a time chart illustrating an ON/OFF state of each of switching elements in the sub-DC/DC conversion unit of FIG. 2.

FIG. 12 is a diagram illustrating a charging current path in the sub-DC/DC conversion unit during a charging current period TS1 in FIG. 11.

FIG. 13 is a diagram illustrating a commutation current path in the sub-DC/DC conversion unit during a commutation current period TS2 in FIG. 11.

FIG. 20 is a configuration diagram illustrating an example of using an N-channel FET as a backflow prevention element in the battery charge/discharge testing device of FIG. 1.

DESCRIPTION OF EMBODIMENT

An example of the present invention will be described in detail below with reference to the accompanying drawings.

Figure 1:
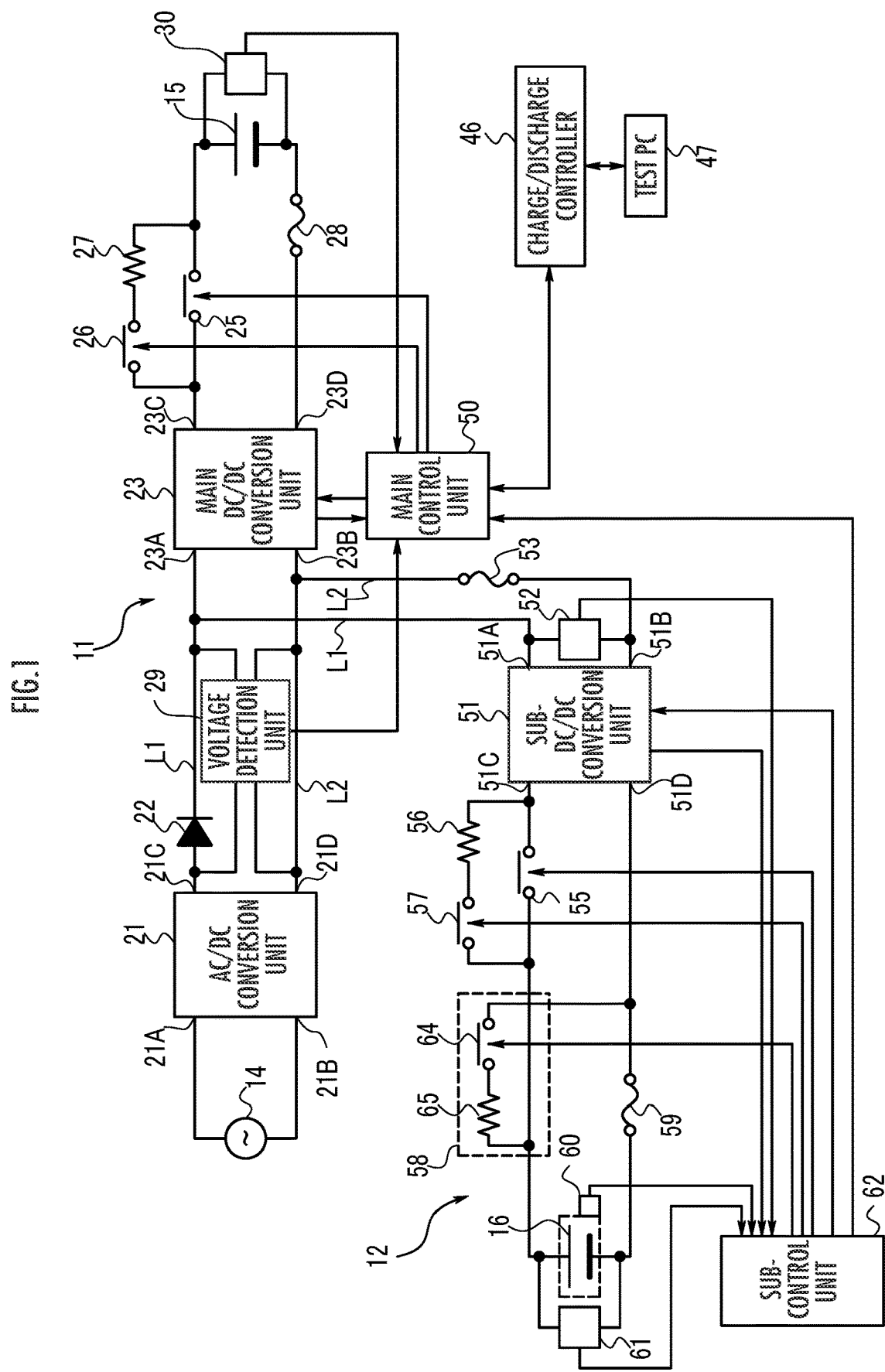
FIG. 1 is a diagram illustrating the circuit configuration of a battery charge/discharge testing device to which the present invention is applied.

FIG. 1 illustrates a battery charge/discharge testing device according to the present invention. This battery charge/discharge testing device includes a main charge/discharge unit 11 and a sub-charge/discharge unit 12. The main charge/discharge unit 11 is a unit for receiving power supply from an AC power supply 14 as a primary power supply to perform charge/discharge tests on a test battery 15 to be tested. The sub-charge/discharge unit 12 is a unit having a built-in battery 16 and for receiving discharge power of the battery 15 as a power supply to charge and discharge the built-in battery 16. The rated voltage of the test battery 15 is, for example, 6 [V], but it may also be a voltage equal to or lower than the output voltage of an AC/DC conversion unit 21. The rated voltage of the built-in battery 16 is 12 [V] in this example, but an actual output voltage VBAT of the built-in battery 16 changes depending on the stored charge state of the built-in battery 16.

The main charge/discharge unit 11 includes the AC/DC conversion unit 21, a diode 22, a main DC/DC conversion unit 23, a main switch 25, a sub-switch 26, a resistor 27, a fuse 28, voltage detection units 29 and 30, and a main control unit 50.

The AC/DC conversion unit 21 configures a DC power supply unit, which is connected to the AC power supply 14. When an output AC voltage of the AC power supply 14 is input to input terminals 21A and 21B, the AC/DC conversion unit 21 converts the AC voltage to a predetermined DC voltage by rectifying the AC voltage, and outputs the DC voltage from output terminals 21C and 21D. In this example, the description will be made on the assumption that the output AC voltage of the AC power supply 14 is 200 [V] and the output DC voltage of the AC/DC conversion unit 21 is a constant voltage of 24.0 [V].

The anode of the diode 22 is connected to the output terminal on the positive voltage side of the AC/DC conversion unit 21. The cathode of the diode 22 is connected to a terminal 23A of the main DC/DC conversion unit 23 through a bus line L1. The output terminal 21D on the negative voltage side of the AC/DC conversion unit 21 is connected to a terminal 23B of the main DC/DC conversion unit 23 through a bus line L2. The diode 22 is to make a current flow only in one direction from the anode to the cathode. Specifically, the diode 22 makes a charging current flow from the AC/DC conversion unit 21 into the main DC/DC conversion unit 23, and prevents a discharging current from the main DC/DC conversion unit 23 from flowing into the AC/DC conversion unit 21. Further, the diode 22 also prevents a discharging current from a sub-DC/DC conversion unit 51 to be described later from flowing into the AC/DC conversion unit 21.

Figure 2:
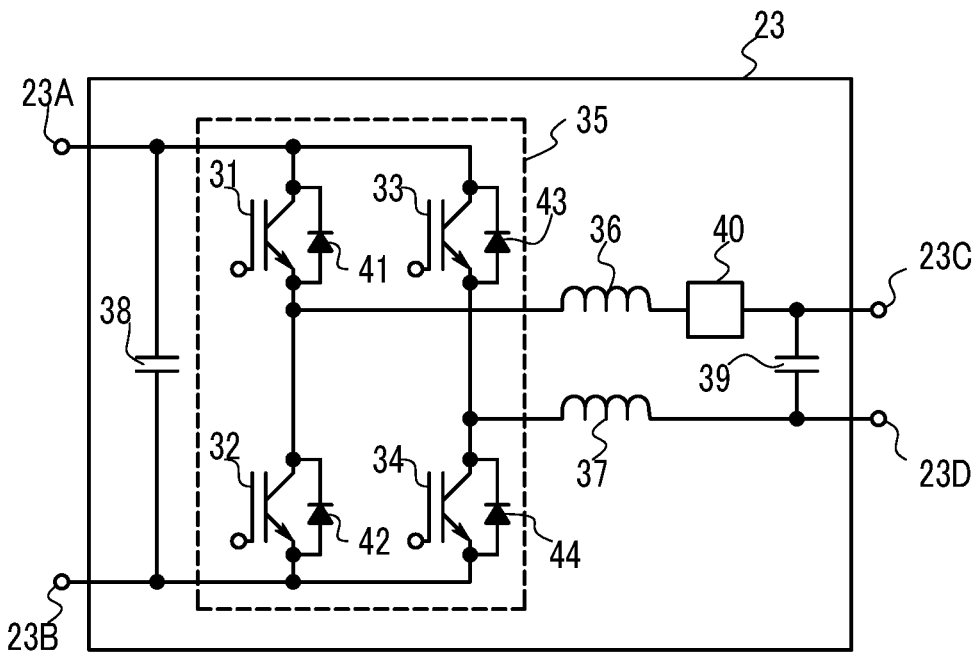
FIG. 2 is a circuit diagram illustrating the configuration of a main DC/DC conversion unit in the battery charge/discharge testing device of FIG. 1.

As illustrated in FIG. 2, the main DC/DC conversion unit 23 includes a full-bridge circuit 35 composed of semiconductor switching elements 31 to 34 such as four IGBTs (Insulated Gate Bipolar Transistors), choke coils 36 and 37, capacitors 38 and 39, and a current detection unit 40.

The main DC/DC conversion unit 23 has four external connection terminals 23A to 23D. The capacitor 38 is connected between the terminals 23A and 23B.

The full-bridge circuit 35 is a first full-bridge circuit, and the semiconductor switching elements 31 to 34 correspond to first to fourth switching elements. In the full-bridge circuit 35, one ends of the semiconductor switching elements 31 and 33 are connected to the terminal 23A (one of two first input terminals), and one ends of the semiconductor switching elements 32 and 34 are connected to the terminal 23B (the other of the two first input terminals). The other ends of the semiconductor switching elements 31 and 32 are connected to each other, and the connection point is connected to the terminal 23C (one of two first output terminals) through the choke coil 36 and the current detection unit 40 in series. Further, the other ends of the semiconductor switching elements 33 and 34 are connected to each other, and the connection point is connected to the terminal 23D (the other of the two first output terminals) through the choke coil 37. The capacitor 39 is connected between the terminals 23C and 23D. The choke coils 36 and 37 as inductors and the capacitor 39 as a capacitor construct a first smoothing circuit.

The semiconductor switching elements 31 to 34 respectively have freewheeling diodes 41 to 44 to prevent damage at turn-on. Specifically, each freewheeling diode 41-44 is connected to each semiconductor switching element 31-34 in parallel, respectively. When the IGBT is used as the semiconductor switching element, the cathode of the freewheeling diode is connected to the collector of the IGBT, and the anode of the freewheeling diode is connected to the emitter of the IGBT.

Basically, by setting, as one cycle T1 (first cycle), a period consisting of a charging current period TM1 in which the semiconductor switching elements 31 and 34 are ON and the semiconductor switching elements 32 and 33 are OFF, a commutation current period TM2 in which the semiconductor switching elements 31 to 34 are OFF and the freewheeling diodes 42 and 43 are ON, a discharging current period TM3 in which the semiconductor switching elements 31 and 34 are OFF and the semiconductor switching elements 32 and 33 are ON, and a commutation current period TM4 in which the semiconductor switching elements 31 to 34 are OFF and the freewheeling diodes 41 and 44 are ON, the full-bridge circuit 35 repeats the cycle. The ON/OFF of the semiconductor switching elements 31 to 34 is controlled by the main control unit 50. The charging current period TM1 and the discharging current period TM3 are duty-ratio controlled. In this example, the duty ratio of this main control unit 50 is denoted by DM, which is a ratio of the charging current period TM1 to a total period of the charging current period TM1 and the discharging current period TM3. For example, when the main charge/discharge unit 11 is in a charge test mode for the battery 15, since the duty ratio DM becomes greater than 50%, that is, the charging current period TM1 in the one cycle T1 becomes longer than the discharging current period TM3, the battery 15 is charged by the charging current flowing through the battery 15. On the other hand, when the main charge/discharge unit 11 is in a discharge test mode for the battery 15, since the duty ratio DM becomes less than 50%, that is, the charging current period TM1 in the one cycle T1 becomes shorter than the discharging current period TM3, the battery 15 is discharged by the discharging current.

The terminal 23C of the main DC/DC conversion unit 23 is connected to the positive terminal of the battery 15 through the main switch 25 in series. A series circuit of the sub-switch 26 and the resistor 27 is connected to the main switch 25 in parallel. The terminal 23D of the main DC/DC conversion unit 23 is connected to the negative terminal of the battery 15 through the fuse 28. For example, when the charging voltage of the battery 15 is a predetermined first threshold voltage or less at the start of charge/discharge tests, the sub-switch 26 is first turned on upon supplying the charging current to the battery 15, and then the main switch 25 is turned on after a predetermined fixed time has passed. This is to prevent an excessive charging current from being supplied from the battery 15 to the capacitor 39 of the main DC/DC conversion unit 23 due to a difference between the voltage of the capacitor 39 of the main DC/DC conversion unit 23 and the voltage of the battery 15 at the start of the charge/discharge tests.

The current detection unit 40 detects a value of current flowing between the full-bridge circuit 35 and the battery 15. In other words, the current detection unit 40 detects a value of the charging current to charge the battery 15 in the charge test mode, and detects a value of the discharging current when the battery 15 discharges in the discharge test mode. The current detection unit 40 is composed, for example, of a resistor or a current sensor. The voltage detection unit 29 detects a voltage between the output terminals 21C and 21D of the AC/DC conversion unit 21, and a voltage VDC between the terminals 23A and 23B of the main DC/DC conversion unit 23. The voltage VDC is a bus line voltage between the bus lines L1 and L2. The voltage detection unit 30 detects a voltage between the positive and negative terminals of the battery 15.

The main control unit 50 is composed, for example, of a microcomputer. The respective detection outputs of the current detection unit 40, and the voltage detection units 29 and 30 are connected to the main control unit 50, and the detected current value by the current detection unit 40, and respectively detected voltage values of the voltage detection units 29 and 30 are supplied to the main control unit 50. The main control unit 50 is connected to the main DC/DC conversion unit 23 to control ON/OFF of the semiconductor switching elements 31 to 34 in the main DC/DC conversion unit 23. The main control unit 50 is connected to control terminals of the main switch 25 and the sub-switch 26 to control ON/OFF of the main switch 25 and the sub-switch 26, respectively.

Further, a test PC (personal computer) 47 is connected to the main control unit 50 through a charge/discharge controller 46. Thus, various operation commands are supplied from the test PC 47 to the main control unit 50 through the charge/discharge controller 46 during the charge/discharge tests of the battery 15 according to operations on the test PC 47.

In addition to the built-in battery 16 described above, the sub-charge/discharge unit 12 has the sub-DC/DC conversion unit 51, a voltage detection unit 52, a fuse 53, a main switch 55, a resistor 56, a sub-switch 57, a simple discharge circuit 58, a fuse 59, a temperature sensor 60, a voltage detection unit 61, and a sub-control unit 62.

Figure 3:
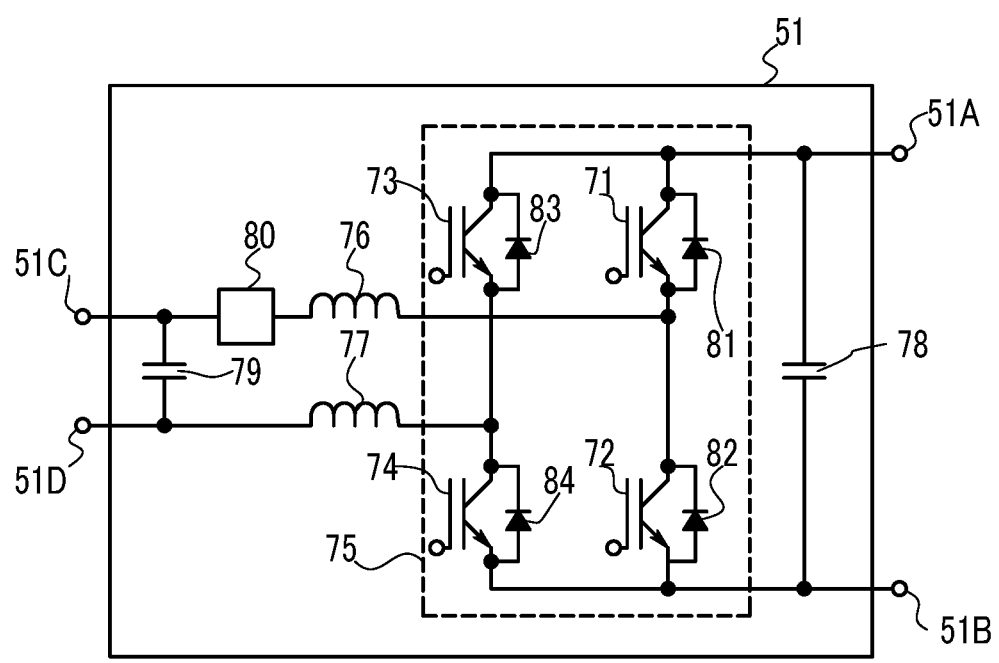
FIG. 3 is a circuit diagram illustrating the configuration of a sub-DC/DC conversion unit in the battery charge/discharge testing device of FIG. 1.

As illustrated in FIG. 3, the sub-DC/DC conversion unit 51 has a configuration similar to the main DC/DC conversion unit 23, which includes a full-bridge circuit 75 composed of semiconductor switching elements 71 to 74 such as four IGBTs (Insulated Gate Bipolar Transistors), choke coils 76 and 77, capacitors 78 and 79, and a current detection unit 80.

The sub-DC/DC conversion unit 51 has four external connection terminals 51A to 51D. The capacitor 78 is connected between the terminals 51A and 51B.

The full-bridge circuit 75 is a second full-bridge circuit, and the semiconductor switching elements 71 to 74 correspond to fifth to eighth switching elements. In the full-bridge circuit 75, one ends of the semiconductor switching elements 71 and 73 are connected to the terminal 51A (one of two second input terminals), and one ends of the semiconductor switching elements 72 and 74 are connected to the terminal 51B (the other of the two second input terminals). The other ends of the semiconductor switching elements 71 and 72 are connected to each other, and the connection point is connected to the terminal 51C (one of two second output terminals) through the choke coil 76 and the current detection unit 80 in series. Further, the other ends of the semiconductor switching elements 73 and 74 are connected to each other, and the connection point is connected to the terminal 51D (the other of the two second output terminals) through the choke coil 77. The capacitor 79 is connected between the terminals 51C and 51D. The choke coils 76 and 77, and the capacitor 79 construct a second smoothing circuit.

Like the semiconductor switching elements 31 to 34, the semiconductor switching elements 71 to 74 respectively have freewheeling diodes 81 to 84 to prevent damage at turn-on.

Basically, by setting, as one cycle T2 (second cycle), a period consisting of a charging current period TS1 in which the semiconductor switching elements 71 and 74 are ON and the semiconductor switching elements 72 and 73 are OFF, a commutation current period TS2 in which the semiconductor switching elements 71 to 74 are OFF and the freewheeling diodes 82 and 83 are ON, a discharging current period TS3 in which the semiconductor switching elements 71 and 74 are OFF and the semiconductor switching elements 72 and 73 are ON, and a commutation current period TS4 in which the semiconductor switching elements 71 to 74 are OFF and the freewheeling diodes 81 and 84 are ON, the full-bridge circuit 75 repeats the cycle. The ON/OFF of the semiconductor switching elements 71 to 74 is controlled by the sub-control unit 62. Further, the charging current period TS1 and the discharging current period TS3 in the one cycle T2 are duty-ratio controlled. The duty ratio of this sub-control unit 62 is denoted by DS below, which is a ratio of the charging current period TS1 to a total period of the charging current period TS1 and the discharging current period TS3. When the sub-charge/discharge unit 12 is in a charge mode, since the duty ratio DS becomes greater than 50%, that is, the charging current period TS1 in the one cycle T2 becomes longer than the discharging current period TS3, the built-in battery 16 is charged by the charging current flowing through the built-in battery 16. On the other hand, when the sub-charge/discharge unit 12 is in a discharge mode, since the duty ratio DS becomes less than 50%, that is, the charging current period TS1 in the one cycle T2 becomes shorter than the discharging current period TS3, the built-in battery 16 is discharged by the discharging current from the built-in battery 16.

The terminal 51C of the sub-DC/DC conversion unit 51 is connected to the positive terminal of the built-in battery 16 through the main switch 55. A series circuit of the resistor 56 and the sub-switch 57 is connected to the main switch 55 in parallel. The math switch 55 and the sub-switch 57 are relay switches. The resistor 56 and the sub-switch 57 are provided to prevent an excessive charging current from flowing from the built-in battery 16 into the capacitor 79 of the sub-DC/DC conversion unit 51 due to a difference between the voltage of the capacitor 79 of the sub-DC/DC conversion unit 51 and the voltage of the built-in battery 16, and to precharge the capacitor 79 immediately after power-on.

The terminal 51D of the sub-DC/DC conversion unit 51 is connected to the negative terminal of the built-in battery 16 through a fuse 59. The current detection unit 80 detects a level of current Isub flowing between the full-bridge circuit 75 of the sub-DC/DC conversion unit 51 and the built-in battery 16. The current detection unit 80 may also have a structure using, for example, a resistor or a current sensor.

The simple discharge circuit 58 is connected between the positive terminal of the built-in battery 16 and a bus line from the terminal 51D to the fuse 59. As an example, the simple discharge circuit 58 is a series circuit of a discharge switch 64 as a relay switch and a resistor 65, but the discharge switch 64 may also be a semiconductor switch such as an FET. When the discharge switch 64 is ON, a circuit with the resistor 65 connected is formed between both terminals of the built-in battery 16 to discharge the stored charge of the built-in battery 16.

The temperature sensor 60 detects the temperature of the built-in battery 16. The voltage detection unit 61 detects the voltage VBAT between the positive and negative terminals of the built-in battery 16.

The sub-control unit 62 is composed, for example, of a microcomputer. The respective detection outputs of the voltage detection units 52 and 61, the current detection unit 80, and the temperature sensor 60 are connected to the sub-control unit 62, and respectively detected voltage values of the voltage detection units 52 and 61, the detected current value of the current detection unit 80, and the detected temperature value of the temperature sensor 60 are supplied to the sub-control unit 62. The sub-control unit 62 is connected to the sub-DC/DC conversion unit 51 to control ON/OFF of the semiconductor switching elements 71 to 74 of the full-bridge circuit 75 in the sub-DC/DC conversion unit 51 based on the respectively detected voltage values of the voltage detection units 52 and 61, the detected current value of the current detection unit 80, and the detected temperature value of the temperature sensor 60. Further, the sub-control unit 62 is connected to respective control terminals of the main switch 55, the sub-switch 57, and the discharge switch 64 to control ON/OFF of the main switch 55, the sub-switch 57, and the discharge switch 64, respectively.

Further, the sub-control unit 62 and the main control unit 50 are connected through the bus lines L1 and L2. When an operation error occurs in the sub-control unit 62, an error occurrence signal is supplied from the sub-control unit 62 to the main control unit 50.

As a DC power supply for the control operation of each of the main control unit 50 and the sub-control unit 62, output power of the AC/DC conversion unit 21 may be used, or another power supply may be prepared.

Next, the operation of the battery charge/discharge testing device having such a configuration according to the present invention will be described.

In the main charge/discharge unit 11, when the output AC voltage of the AC power supply 14 is supplied to the AC/DC conversion unit 21, the AC/DC conversion unit 21 outputs a DC voltage of 24 [V]. The output DC voltage of 24 [V] of the AC/DC conversion unit 21 is supplied between the terminals 23A and 23B of the main DC/DC conversion unit 23 through the diode 22. A positive potential 24 [V] is applied to the terminal 23A, and a potential 0 [V] is applied to the terminal 23B.

Although the voltage supplied between the terminals 23A and 23B of the main DC/DC conversion unit 23 from the AC/DC conversion unit 21 through the diode 22 is a voltage lower by a forward voltage drop of the diode 22 from the DC voltage 24 [V] to be precise, the description will be made on the assumption that the DC voltage is 24 [V].

For example, in every one cycle T1, the main control unit 50 determines the duty ratio DM in such a manner, for example, that the voltage of the battery 15 becomes a desired voltage value or each of the charging current and the discharging current becomes a desired current value, respectively, according to the current value of the charging current or the discharging current obtained from the current detection unit 40, and each of the voltage values obtained from the voltage detection units 29 and 30, and supplies a control signal indicative of the duty ratio DM to the main DC/DC conversion unit 23.

When the control signal for the semiconductor switching elements 31 to 34 is supplied from the main control unit 50 to the main DC/DC conversion unit 23 in such a state that the DC voltage of 24 [V] is applied between the terminals 23A and 23B of the main DC/DC conversion unit 23, the semiconductor switching elements 31 to 34 start ON/Off operation.

Figure 4:
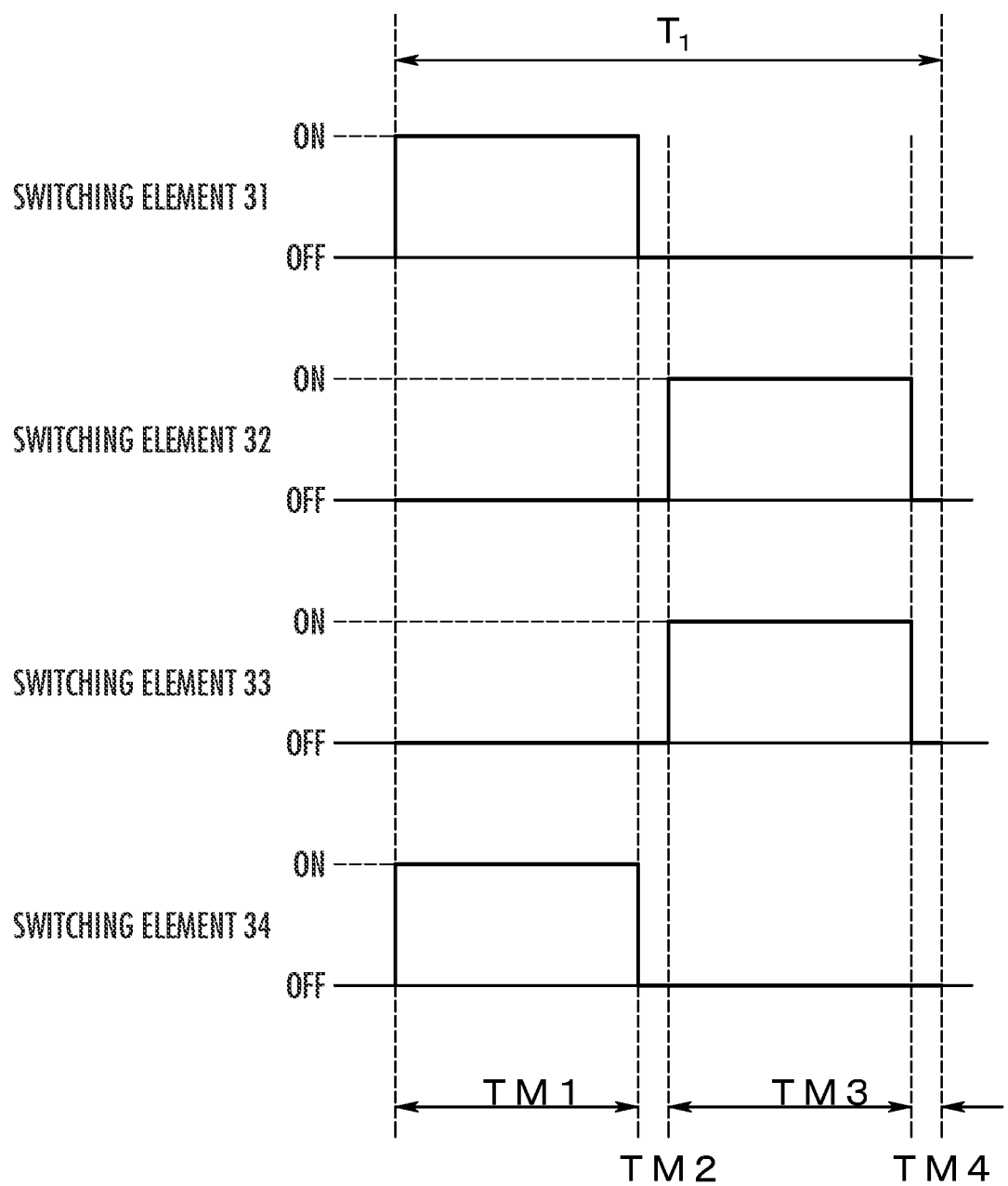
FIG. 4 is a time chart illustrating an ON/OFF state of each switching element in the main DC/DC conversion unit of FIG. 2.

As illustrated in FIG. 4, in the main DC/DC conversion unit 23, ON/OFF control of the semiconductor switching elements 31 to 34 is repeatedly performed by setting the charging current period TM1, the commutation current period TM2, the discharging current period TM3, and the commutation current period TM4 as one cycle T1. In the charging current period TM1, the semiconductor switching elements 31 and 34 are ON, and the semiconductor switching elements 32 and 33 are OFF, while in the discharging current period TM3, the semiconductor switching elements 31 and 34 are OFF, and the semiconductor switching elements 32 and 33 are ON. In the commutation current period TM2 immediately after the end of the charging current period TM1, the semiconductor switching elements 31 to 34 are all OFF. In the commutation current period TM4 immediately after the end of the discharging current period TM3, the semiconductor switching elements 31 to 34 are all OFF as well. In the control when the duty ratio DM is 50%, the charging current period TM1 and the discharging current period TM3 have a length $\{T1-(TM2+TM4)\}/2$ equal to each other.

Figure 5:
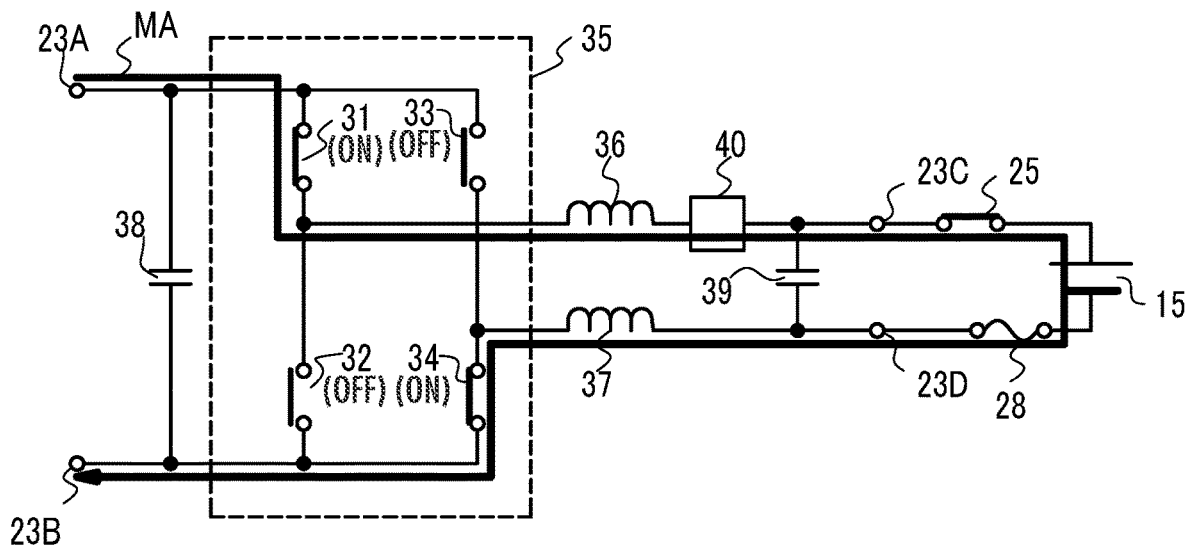
FIG. 5 is a diagram illustrating a charging current path in the main DC/DC conversion unit during a charging current period TM1 in FIG. 4.

In the charging current period TM1, as indicated by an arrow MA in FIG. 5, the charging current flows into the battery 15 from the positive terminal of the battery 15 through the terminal 23A, the semiconductor switching elements 31, the choke coil 36, the current detection unit 40, the terminal 23C, and the main switch 25 in this order, and then flows from the negative terminal of the battery 15 through the fuse 28, the terminal 23D, the choke coil 37, the semiconductor switching elements 34, and the terminal 23B in this order. This charging current flow causes the battery 15 to be charged, and the electric charge is stored in the battery 15.

Figure 6:
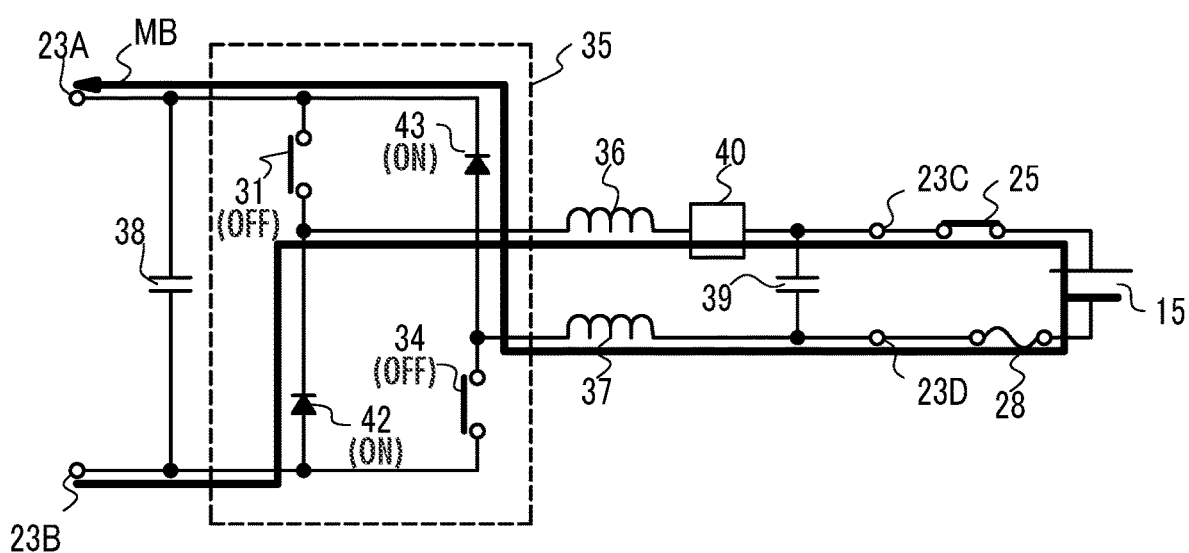
FIG. 6 is a diagram illustrating a commutation current path in the main DC/DC conversion unit during a commutation current period TM2 in FIG. 4.

In the commutation current period TM2, as indicated by an arrow MB in FIG. 6, energy stored in the choke coils 36 and 37 in the charging current period TM1 makes a commutation current flow in the flowing direction of the charging current. In this commutation current period TM2, the freewheel diodes 42 and 43 are turned on to make the commutation current flow in a path of the terminal 23B, the freewheeling diode 42, the choke coil 36, the current detection unit 40, the terminal 23C, the main switch 25, the battery 15, the fuse 28, the terminal 23D, the choke coil 37, the freewheeling diode 43, and the terminal 23A to charge the battery 15.

Figure 7:
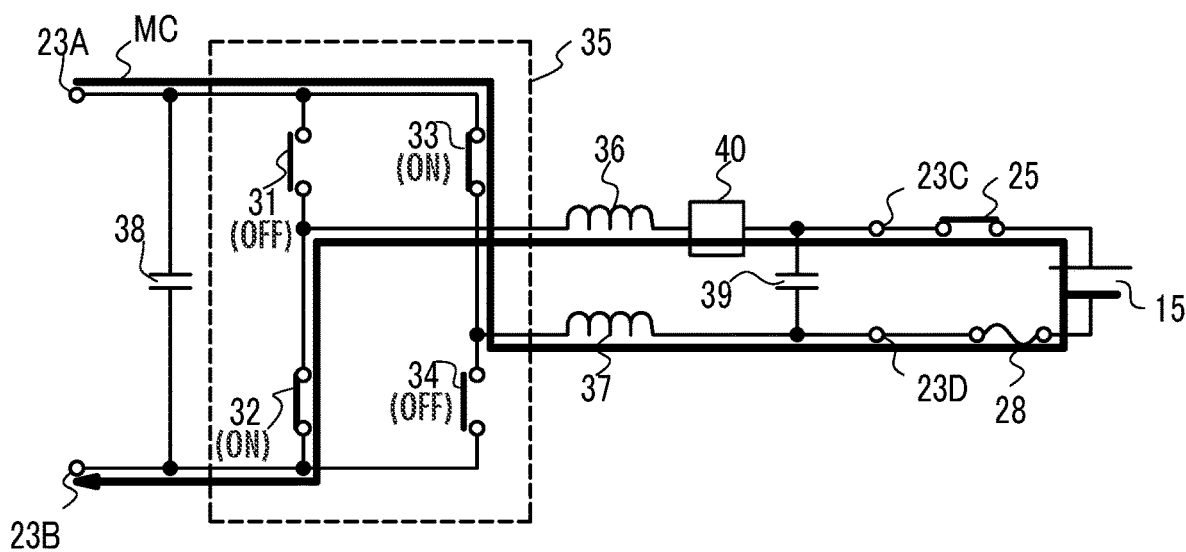
FIG. 7 is a diagram illustrating a discharging current path in the main DC/DC conversion unit during a discharging current period TM3 in FIG. 4.

In the discharging current period TM3, as indicated by an arrow MC in FIG. 7, the discharging current flows into the negative terminal of the battery 15 through the terminal 23A, the semiconductor switching elements 33, the choke coil 37, the terminal 23D, and the fuse 28, and further from the positive terminal of the battery 15 into the terminal 23B through the main switch 25, the terminal 23C, the current detection unit 40, the choke coil 36, and the semiconductor switching element 32 in this order. This discharging current is a current to discharge the electric charge stored in the battery 15.

Figure 8:
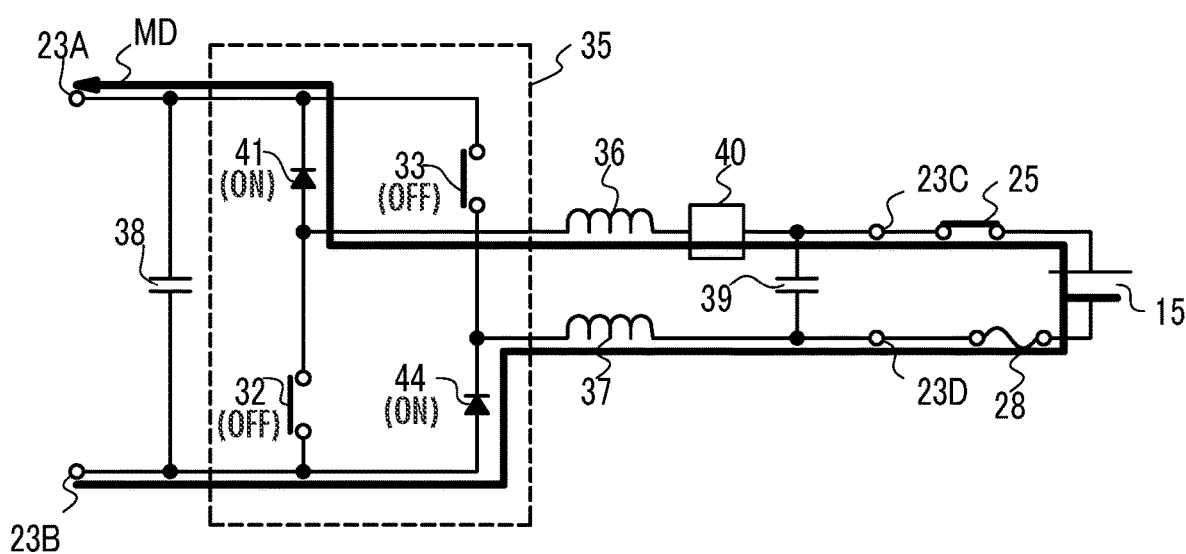
FIG. 8 is a diagram illustrating a commutation current path in the main DC/DC conversion unit during a commutation current period TM4 in FIG. 4.

In the commutation current period TM4, as indicated by an arrow MD in FIG. 8, energy stored in the choke coils 36 and 37 in the discharging current period TM3 makes a commutation current flow in the flowing direction of the discharging current. In the commutation current period TM4, the freewheeling diodes 41 and 44 are turned on to make the commutation current flow in a path of the terminal 23B, the freewheeling diode 44, the choke coil 37, the terminal 23D, the fuse 28, the battery 15, the main switch 25, the terminal 23C, the current detection unit 40, the choke coil 36, the freewheeling diode 41, and the terminal 23A to obtain, as regenerative power, discharge power due to communication between the terminals 23A and 23B. A total voltage of a voltage between terminals of the choke coil 36, a voltage between the terminals of the battery 15, and a voltage between terminals of the choke coil 37 is generated between the terminals 23A and 23B as a regenerative voltage. This regenerative voltage drops according to a drop in the voltage (output voltage) between the terminals of the battery 15 due to the discharge of the battery 15, and the energy release of the choke coils 36 and 37.

Note that, since the diode 22 is provided on the line L1 leading to the terminal 23A, even when a DC voltage between the lines L1 and L2 becomes higher than the output DC voltage of 24 [V] of the AC/DC conversion unit 21 due to the regenerative voltage, a current flow into the AC/DC conversion unit 21 through the line L1 is blocked.

Operation in the one cycle T1 is determined to be the charge test mode or the discharge test mode depending on the duty ratio DM as a ratio between the charging current period TM1 and the discharging current period TM3 in the one cycle T1 mentioned above. In the control of the duty ratio DM in the charge test mode, since the charging current period TM1 in the one cycle T1 increases but the discharging current period TM3 decreases, the amount of charge charged to the battery 15 by the charging current in the charging current period TM1 exceeds the amount of charge discharged from the battery 15 by the discharging current in the discharging current period TM3. This results in the fact that the battery 15 is charged in the one cycle T1.

On the other hand, in the control of the duty ratio DR in the discharge test mode, since the charging current period TM1 in the one cycle T1 decreases but the discharging current period TM3 increases, the amount of charge discharged from the battery 15 by the discharging current in the discharging current period TM3 exceeds the amount of charge charged by the charging current in the charging current period TM1. This results in the fact that the battery 15 is discharged in the one cycle T1.

In the charge test mode, for example, the duty ratio DM is so controlled that the current value detected by the current detection unit 40 becomes a predetermined charging current value until the voltage value of the battery 15 detected by the voltage detection unit 30 rises up to a set voltage value V1. In the discharge test mode, for example, the duty ratio DM is so controlled that the current value detected by the current detection unit 40 becomes a predetermined discharging current value until the voltage value of the battery 15 detected by the voltage detection unit 30 drops up to a set voltage value V2 (V2<V1).

The duty ratio DM in the cycle T1 in which the amount of charge charged in the charging current period TM1 and the amount of charge discharged in the discharging current period TM3 are equal to each other is, for example, 50%. In this case, since the charging current and the discharging current in the one cycle T1 cancel each other, the average current becomes 0, and this results in the fact that the charge amount of the battery 15 does not change.

On the other hand, in the sub-charge/discharge unit 12, the built-in battery 16 is charged by using, as a power supply, the regenerative power (discharge power) generated in the discharge test mode of the main control unit 50 mentioned above, and the charge stored in the built-in battery 16 by the charge is used as part of the DC power supply in the charge test mode of the main control unit 50.

Figure 9:
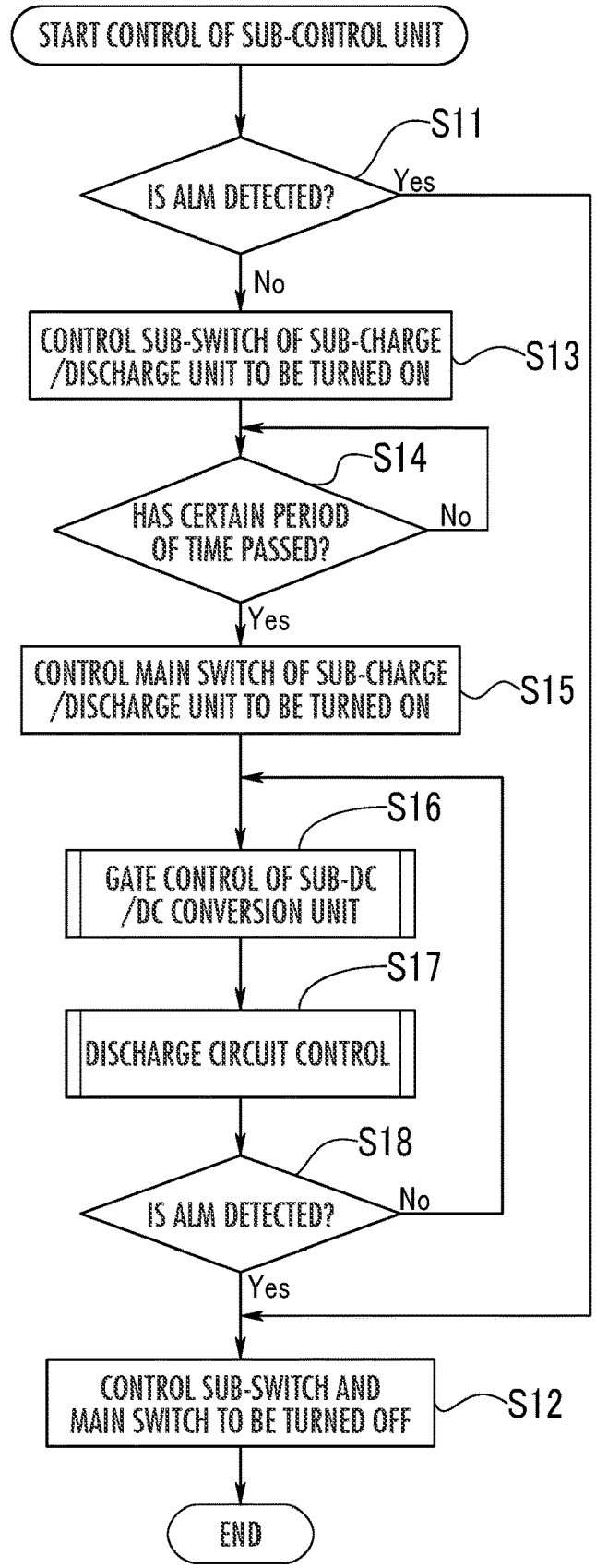
FIG. 9 is a flowchart illustrating control operation of a sub-control unit in the battery charge/discharge testing device of FIG. 1.

As illustrated in FIG. 9, when the AC power supply 14 is turned on, the sub-control unit 62 determines whether or not ALM (alarm) occurs (step S11). The ALM includes the upper/lower limit temperature abnormalities of the built-in battery 16 detected by the temperature sensor 60, the upper/lower limit abnormalities of the output voltage VBAT of the built-in battery 16 detected by the voltage detection unit 61, the upper/lower limit abnormalities of the charging/discharging current ISUB detected by the current detection unit 80, and the upper/lower abnormalities of the bus line voltage VDC detected by the voltage detection unit 52. When such ALM occurs, the sub-control unit 62 controls both the main switch 55 and the sub-switch 57 of the sub-charge/discharge unit 12 to be turned off (step S12). On the other hand, when no ALM is notified, the sub-control unit 62 controls the sub-switch 57 to be turned on (step S13), and determines whether or not a certain period of time Tpchg has passed since that point by the count of a timer, not illustrated (step S14).

Figure 10:
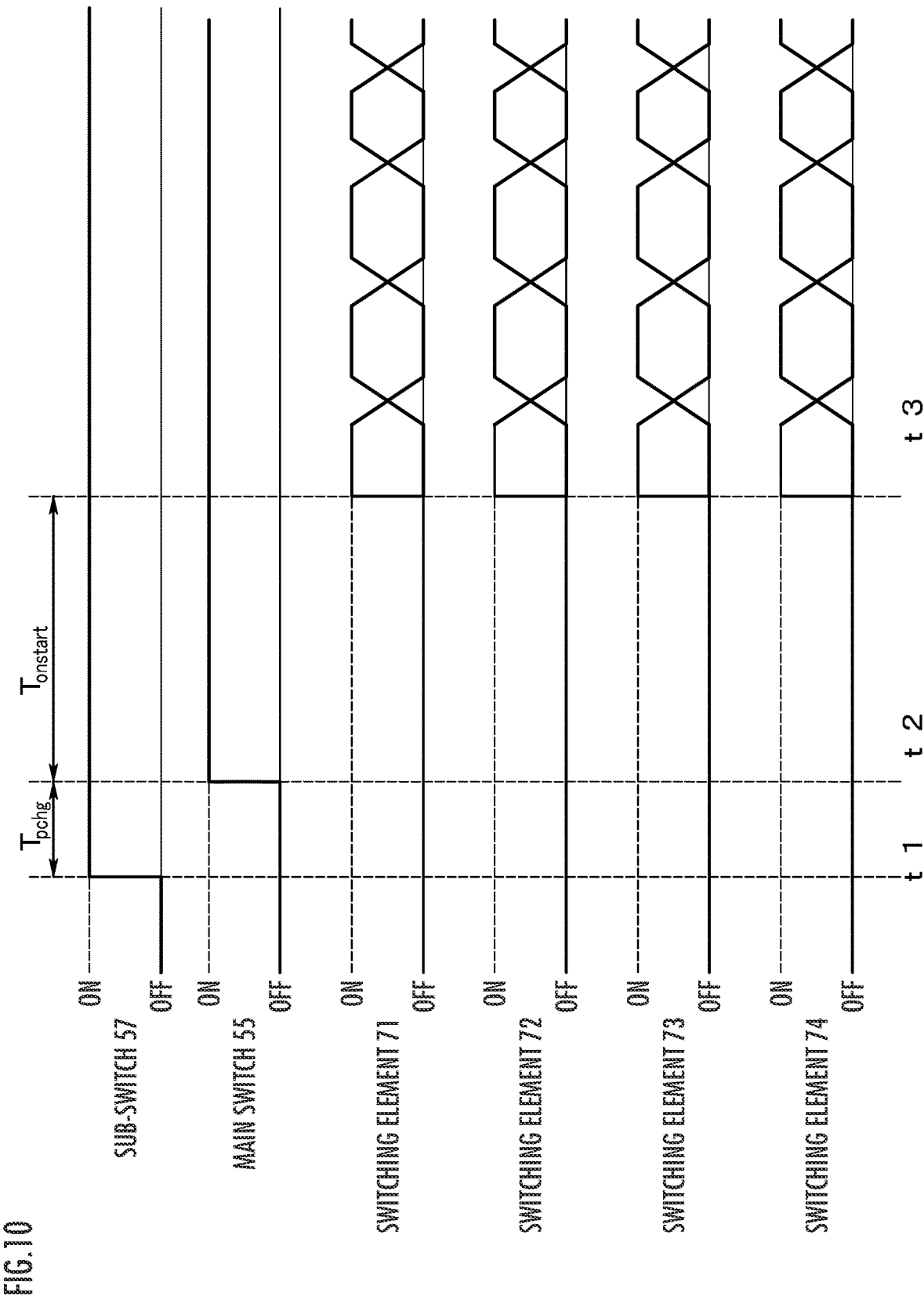
FIG. 10 is a time chart illustrating turn-on time points of a sub-switch and a main switch at the start of control of the sub-control unit, and time points when ON/OFF operations of respective switching elements in the sub-DC/DC conversion unit are started.

As illustrated in FIG. 10, when the sub-switch 57 is turned on at time point t1, a path from the positive terminal of the built-in battery 16 to the negative terminal of the built-in battery 16 through the sub-switch 57, the resistor 56, the terminal 51C, the capacitor 79, the terminal 51D, and the fuse 59 is formed. In this path, a current flows from the built-in battery 16 to charge the capacitor 79, that is, to precharge the capacitor 79. The current flowing through the capacitor 79 during precharging is limited by the resistor 56 over the certain period of time Tpchg.

When the certain period of time Tpchg has passed, the sub-control unit 62 controls the main switch 55 of the sub-charge/discharge unit 12 to be turned on (step S15). This causes the sub-DC/DC conversion unit 51 and the built-in battery 16 to be electrically connected through the main switch 55, and the sub-control unit 62 executes sub-routines consisting of gate control of the sub-DC/DC conversion unit 51 (step S16) and discharging circuit control (step 17).

After executing the gate control of the sub-DC/DC conversion unit 51 in step 16 and the discharging circuit control in step 17, the sub-control unit 62 determines whether or not the ALM occurs (step S 18). When no ALM occurs, the sub-control unit 62 executes the sub-DC/DC gate control in step 16 and the discharging circuit control in step 17 again. When the ALM occurs, the sub-control unit 62 proceeds to step S12 to control both the main switch 55 and the sub-switch 57 of the sub-charge/discharge unit 12 to be turned off.

As illustrated in FIG. 10, the main switch 55 is controlled from OFF to ON at time point t2 after the certain period of time Tpchg has passed from time point t1. Then, at time point t3 after a further period of time Tonstart has passed, a gate signal is supplied from the sub-control unit 62 to the semiconductor switching elements 71 to 74 of the full-bridge circuit 75 by the execution of the sub-DC/DC gate control in step S16 to start ON/OFF of the semiconductor switching elements 71 to 74.

As illustrated in FIG. 11, in the sub-DC/DC conversion unit 51, ON/OFF control of the semiconductor switching elements 71 to 74 is repeatedly performed by setting the charging current period TS1, the commutation current period TS2, the discharging current period TS3, and the commutation current period TS4 as one cycle T2. In the charging current period TS1, the semiconductor switching elements 71 and 74 are ON, and the semiconductor switching elements 72 and 73 are OFF. In the discharging current period TS3, the semiconductor switching elements 71 and 74 are OFF, and the semiconductor switching elements 72 and 73 are ON. In the commutation current period TS2 immediately after the end of the charging current period TS1, the semiconductor switching elements 71 to 74 are all OFF. Similarly, in the commutation current period TS4 immediately after the end of the discharging current period TS3, the semiconductor switching elements 71 to 74 are all OFF. In the control when the duty ratio DS is 50%, the charging current period TS1 and the discharging current period TS3 have a length {T2−(TS2+TS4)}/2 equal to each other.

In the charging current period TS1, as indicated by an arrow SA in FIG. 12, the charging current flows into the built-in battery 16 from the positive terminal of the built-in battery 16 through the terminal 51A, the semiconductor switching elements 71, the choke coil 76, the current detection unit 80, the terminal 51C, and the main switch 55 in this order, and then flows from the negative terminal of the built-in battery 16 through the fuse 59, the terminal 51D, the choke coil 77, the semiconductor switching elements 74, and the terminal 51B in this order. This charging current flow causes the built-in battery 16 to be charged, and the electric charge is stored in the built-in battery 16.

In the commutation current period TS2, as indicated by an arrow SB in FIG. 13, energy stored in the choke coils 76 and 77 in the charging current period TS1 makes a commutation current flow in the flowing direction of the charging current. In this commutation current period TS2, the freewheeling diodes 82 and 83 are turned on to make the commutation current flow in a path of the terminal 51B, the freewheeling diode 82, the choke coil 76, the current detection unit 80, the terminal 51C, the main switch 55, the built-in battery 16, the fuse 59, the terminal 51D, the choke coil 77, the freewheeling diode 83, and the terminal 51A. This commutation current drops as the energy of the choke coils 76 and 77 is released.

Figure 14:
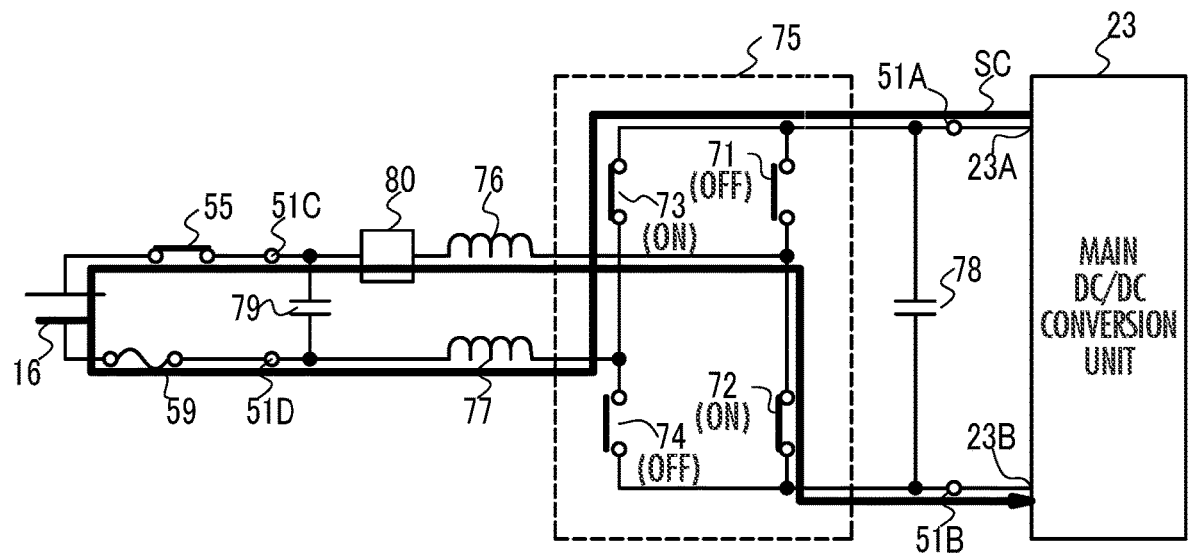
FIG. 14 is a diagram illustrating a discharging current path in the sub-DC/DC conversion unit during a discharging current period TS3 in FIG. 11.

In the discharging current period TS3, as indicated by an arrow SC in FIG. 14, the discharging current flows into the negative terminal of the built-in battery 16 through the terminal 51A, the semiconductor switching elements 73, the choke coil 77, the terminal 51D, and the fuse 59 in this order, and further flows from the positive terminal of the built-in battery 16 into the terminal 51B through the main switch 55, the terminal 51C, the current detection unit 80, the choke coil 76, and the semiconductor switching elements 72 in this order. This discharging current is a current that discharges the stored charge of the built-in battery 16.

Figure 15:
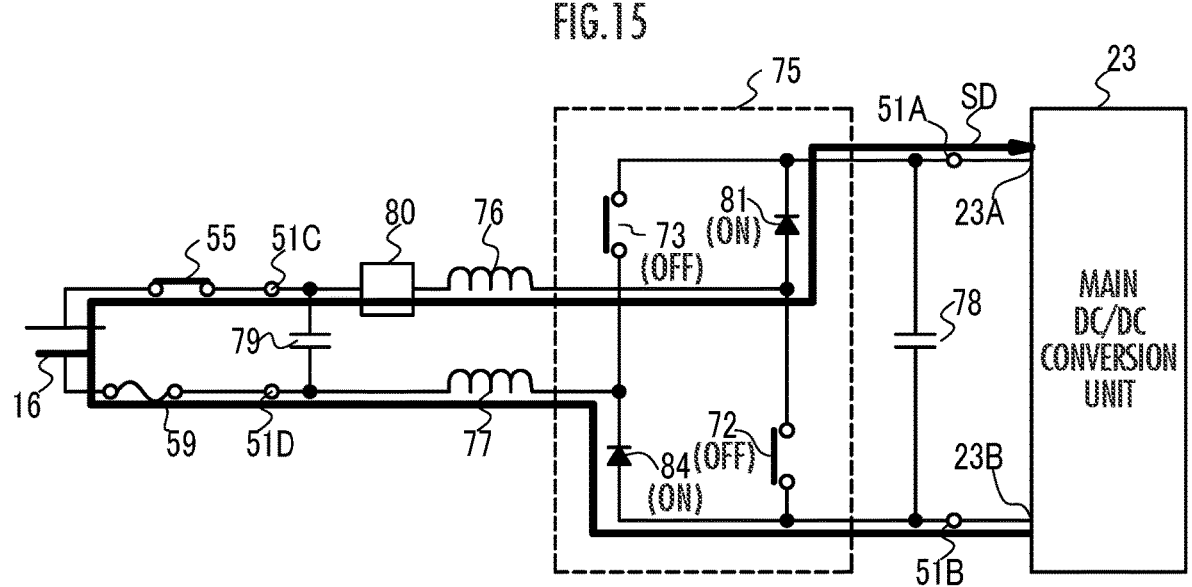
FIG. 15 is a diagram illustrating a commutation current path in the sub-DC/DC conversion unit during a commutation current period TS4 in FIG. 11.

In the commutation current period TS4, as indicated by an arrow SD in FIG. 15, energy stored in the choke coils 76 and 77 in the discharging current period TS3 makes a commutation current flow in the flowing direction of the discharging current. In this commutation current period TS4, the freewheeling diodes 81 and 84 are turned on to make the commutation current flow in a path of the terminal 51B, the freewheeling diode 84, the choke coil 77, the terminal 51D, the fuse 59, the built-in battery 16, the main switch 55, the terminal 51C, the current detection unit 80, the choke coil 76, the freewheeling diode 81, and the terminal 51A to obtain discharge power due to communication between the terminals 51A and 51B as regenerative power. A total voltage of a voltage between terminals of the choke coil 76, a voltage between the terminals of the built-in battery 16, and a voltage between terminals of the choke coil 77 is generated between the terminals 51A and 51B as a regenerative voltage. This regenerative voltage drops as the energy of the choke coils 76 and 77 is released.

Like in the main DC/DC conversion unit 23, operation in the one cycle T2 is also determined to be the charge mode or the discharge mode in the sub-DC/DC conversion unit 51 depending on the duty ratio DS as a ratio between the charging current period TS1 and the discharging current period TS3 in the one cycle T2. In the case of the duty ratio DS in the charge mode, the amount of charge charged to the built-in battery 16 by the charging current in the charging current period TS1 of the one cycle T2 exceeds the amount of charge discharged from the built-in battery 16 by the discharging current in the discharging current period TS3. On the other hand, in the case of the duty ratio DS in the discharge mode, the amount of charge discharged from the built-in battery 16 exceeds the amount of charge charged thereto. The duty ratio DS in the cycle T2 in which the amount of charge charged in the charging current period TS1 and the amount of charge discharged in the discharging current period TS3 are equal to each other is, for example, 50%. In this case, since the charging current and the discharging current in the cycle T2 cancel each other, the average current becomes 0, and this results in the fact that the charge amount of the battery 16 does not change. Whether the operating mode is the charge mode or the discharge mode is set in the sub-DC/DC gate control of step S16 described above.

Next, the details of the gate control of the sub-DC/DC conversion unit 51 in step S16 will be described.

Figure 16:
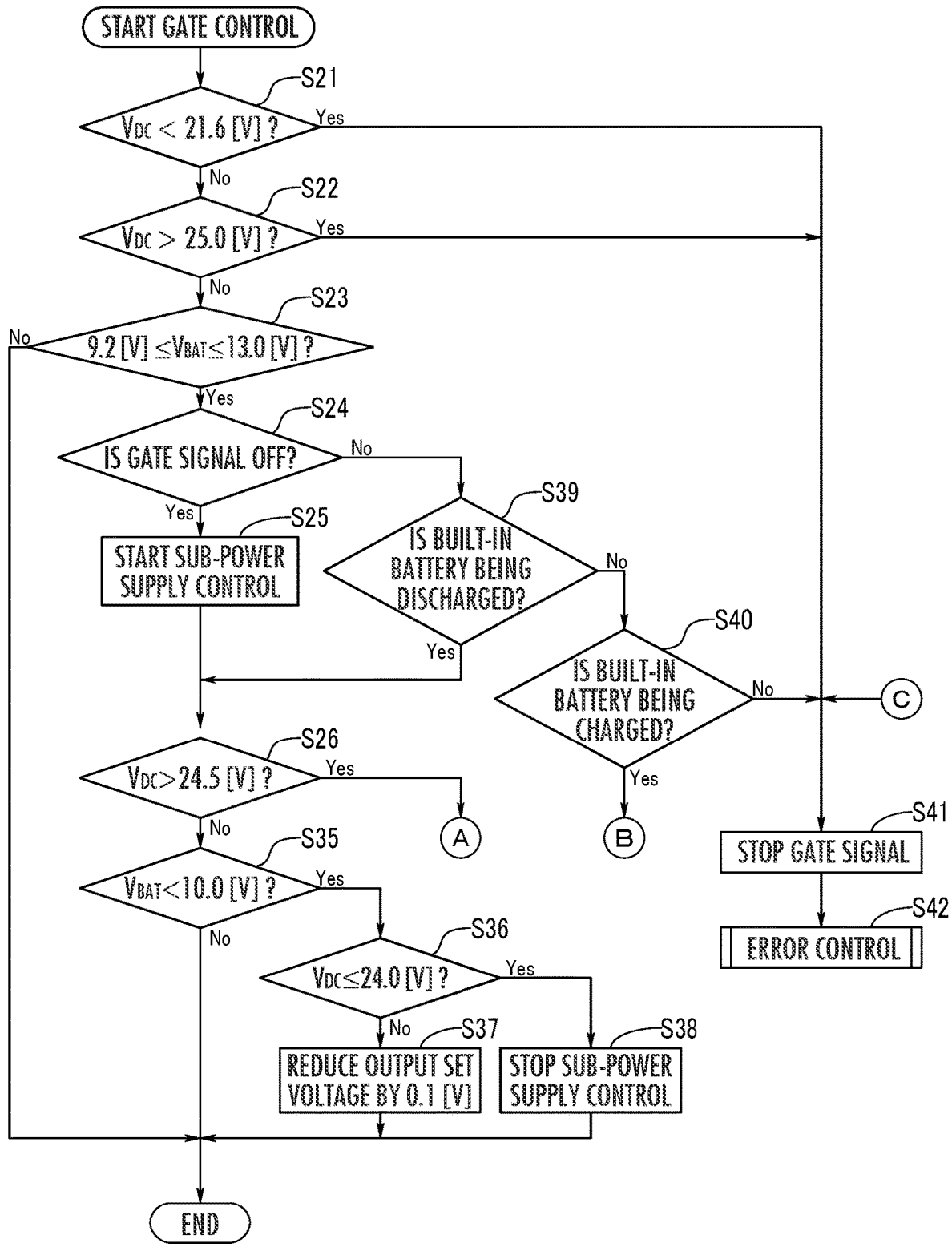
FIG. 16 is a flowchart illustrating gate control of the sub-DC/DC conversion unit during the control operation of the sub-control unit in FIG. 9.
Figure 17:
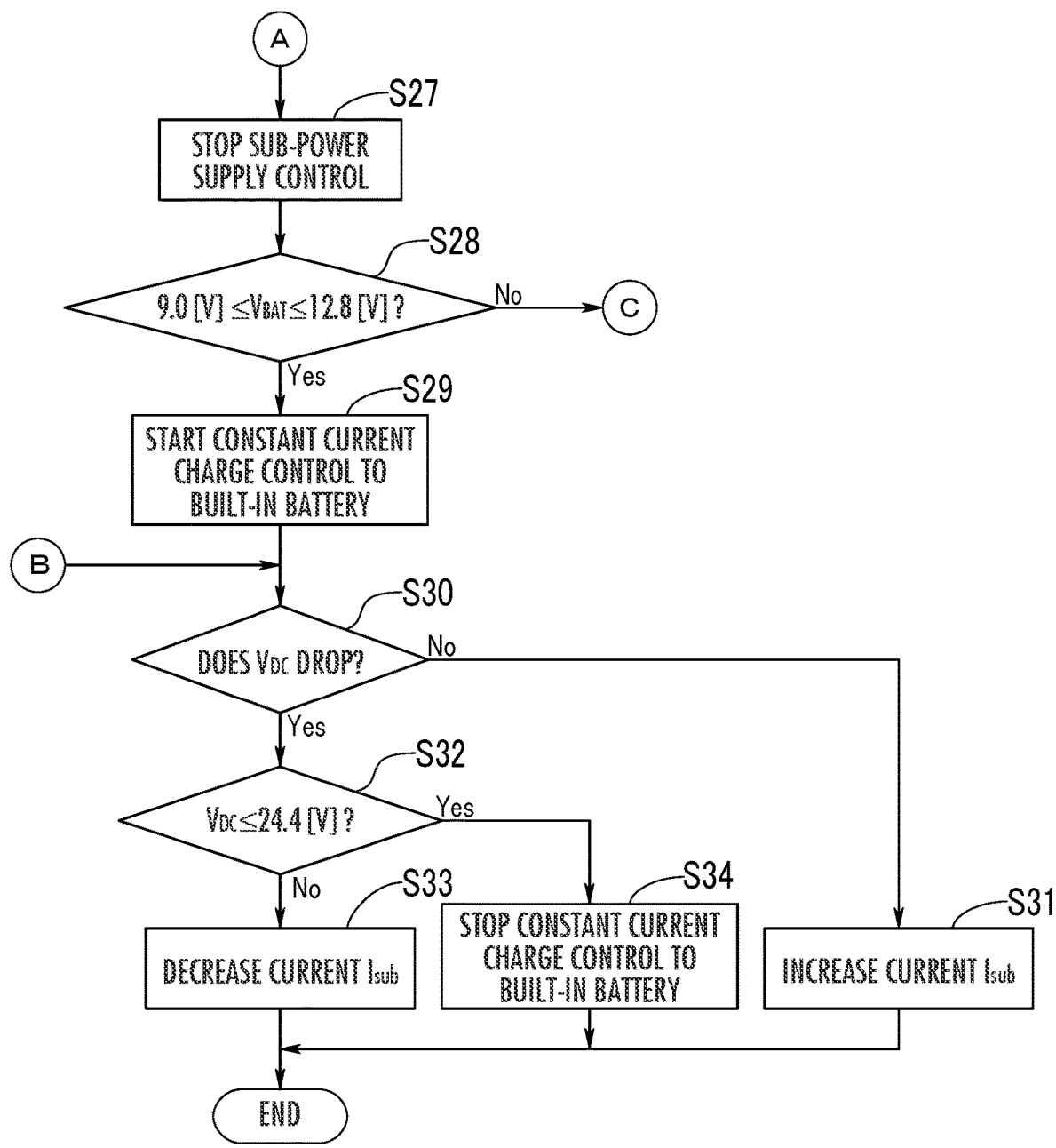
FIG. 17 is a flowchart illustrating the continuation of the gate control in FIG. 16.

As illustrated in FIG. 16 and FIG. 17, in the gate control of step S16, the sub-control unit 62 first determines whether or not the bus line voltage VDC obtained from the voltage detection unit 52 is lower than 21.6 [V] (step S21). When VDC≥21.6 [V], the sub-control unit 62 determines whether or not the bus line voltage VDC is higher than 25.0 [V] (step S22).

As described above, the bus line voltage VDC is the voltage between the terminals 23A and 23B of the main DC/DC conversion unit 23, and a voltage between the terminals 51 A and 51B of the sub-DC/DC conversion unit 51 as well. When regenerative power is generated in the main DC/DC conversion unit 23, the bus line voltage VDC rises higher than the DC voltage of 24 [V] between the terminals 23A and 23B supplied from the AC/DC conversion unit 21.

When 21.6 [V]≤VDC≤25.0 [V], the sub-control unit 62 determines whether or not the output voltage VBAT of the built-in battery 16 falls within a voltage range of 9.2 [V]≤VBAT≤13.0 [V] capable of supplying power (step S23). The output voltage VBAT of the built-in battery 16 is detected by the voltage detection unit 61. When 9.2 [V]≤VBAT≤13.0 [V], the sub-control unit 62 determines whether or not the gate signal is in an OFF state (step S24). When the gate signal is in the OFF state, the sub-control unit 62 starts sub-power supply control (step S25). The OFF state of the gate signal is such a state that all the semiconductor switching elements 71 to 74 of the sub-DC/DC conversion unit 51 are all controlled to OFF. In the sub-power supply control, the sub-DC/DC conversion unit 51 is duty-ratio controlled in the discharge mode mentioned above in such a manner that the bus line voltage VDC becomes a constant voltage of 24.5 [V]. In control in the discharge mode, regenerative power generated by commutation operation in the commutation current period TS4 using stored energy of the built-in battery 16 and the choke coils 76 and 77 is obtained from the sub-DC/DC conversion unit 51 to supply the regenerative power to the main DC/DC conversion unit 23 through the bus lines L1 and L2.

After the start of the sub-power supply control, the sub-control unit 62 determines whether or not the bus line voltage VDC is higher than 24.5 [V] as a first predetermined voltage value (step S26). When VDC>24.5 [V], there is a possibility that the main charge/discharge unit 11 will be in the discharge test mode in which regenerative power is output from the main DC/DC conversion unit 23. Therefore, when VDC>24.5 [V], the sub-control unit 62 stops the sub-power supply control (step S27), and determines whether or not the output voltage VBAT of the built-in battery 16 is in a range of 9.0 [V]≤VBAT≤12.8 [V] (step S28). When 9.0 [V]≤VBAT≤12.8 [V], the sub-control unit 62 starts constant current charge control to the built-in battery 16 (step S29). In the constant current charge control, the sub-DC/DC conversion unit 51 is duty-ratio controlled in the charge mode mentioned above in such a manner that the current ISUB becomes a set constant current value. In control in the charge mode, the sub-control unit 62 starts duty-ratio control using, as a power supply, the regenerative power obtained from the main DC/DC conversion unit 23. The duty ratio DS is such a ratio that the charging current period TS1 in the cycle T2 increases by a predetermined control time length and the discharging current period TS3 decreases by the increased length. Such duty-ratio control in the charge mode results in applying the current Isub as a preset constant current to the built-in battery 16 for each cycle T2 to charge the built-in battery 16. The current Isub is the average value of current flowing through the built-in battery 16 in the cycle T2, that is, the current value detected by the current detection unit 80 as described above.

After executing step S29, the sub-control unit 62 determines whether or not the bus line voltage VDC drops due to the consumption of the regenerative power from the main DC/DC conversion unit 23 (step S30). In step S30, the bus line voltage VDC obtained from the voltage detection unit 52 is observed, and it is determined whether or not the current value is decreased from the previous value of the bus line voltage VDC. When the bus line voltage VDC does not drop, the sub-control unit 62 performs increase control of the current Isub (step S31). In step S31, the duty ratio DS increases to increase the charging current period TS1 in the cycle T2 further by a unit time length and decrease the discharging current period TS3 by the increased length, resulting in increasing the current Isub. The regenerative power from the main DC/DC conversion unit 23 is consumed by the increased amount of the current Isub, resulting in a drop in the bus line voltage VDC.

When determining the drop in the bus line voltage VDC in step S30, the sub-control unit 62 determines whether or not the bus line voltage VDC obtained from the voltage detection unit 52 is 24.4 [V] as a second predetermined voltage value or less (step S32). When VDC>24.4 [V], the sub-control unit 62 performs decrease control of the current Isub (step S33). In step S33, the duty ratio DS decreases to decrease the charging current period TS1 by the unit time length in the cycle T2 and increase the discharging current period TS3 by the decreased length, resulting in decreasing the current Isub. The consumption of the regenerative power is suppressed by the decreased amount of the current Isub.

When determining VDC≤24.4 [V] in step S32, the sub-control unit 62 stops the constant current charge control to the built-in battery 16 because the bus line voltage VDC drops to 24.4 [V] or less by the constant current charge control (step S34).

Further, when determining that VDC≤24.5 [V] in step S26, the sub-control unit 62 determines whether or not the output voltage VBAT of the built-in battery 16 is lower than 10.0 [V] (step S35). When VBAT<10.0 [V], the sub-control unit 62 determines whether or not the bus line voltage VDC is 24.0 [V] or less (step S36). When VDC>24.0 [V], an output set voltage of the main DC/DC conversion unit 23 is reduced by 0.1 [V] (step S37). In other words, even when VBAT becomes lower than 10.0 [V] due to the discharge of the built-in battery 16 during the sub-power supply control, the sub-power supply control is continued while reducing the output set voltage of the main DC/DC conversion unit 23 by 0.1 [V] as long as VDC>24.0 [V]. On the other hand, when VDC<24.0 [V], the sub-control unit 62 stops the sub-power supply control (step S38).

When determining in step S24 that the gate signal is not in the OFF state, the sub-control unit 62 determines whether or not the built-in battery 16 is discharging, that is, whether or not the built-in battery 16 is in the discharge mode (step S39). When the built-in battery 16 is in the discharge mode, since it is during the sub-power supply control, the sub-control unit 62 proceeds to step S26 mentioned above to determine whether or not the bus line voltage VDC is higher than 24.5 [V].

On the other hand, when determining in step S39 that the built-in battery 16 is not in the discharge mode, the sub-control unit 62 determines whether or not the built-in battery 16 is being charged, that is, whether or not the built-in battery 16 is in the charge mode (step S40). When the built-in battery 16 is in the charge mode, since it is during the constant current charge control to the built-in battery 16, the sub-control unit 62 proceeds to step S30 mentioned above to determine whether or not the bus line voltage VDC drops. When determining in step S40 that the built-in battery 16 is not in the charge mode, the sub-control unit 62 stops the generation of the gate signal (step S41), and executes error control (step S42). Step S41 and step S42 are also executed when the bus line voltage VDC is a low voltage as a result of the determination that VDC<21.6 [V] in step S21, when the bus line voltage VDC is an overvoltage as a result of the determination that VDC>25.0 [V] in step S22, and further when the built-in battery 16 is a low voltage as a result of the determination that VBAT<9.0 [V] or when the built-in battery 16 is an overvoltage as a result of the determination that VBAT>12.8 [V] in step S28.

By stopping the generation of the gate signal in step S41, the above-mentioned gate signal becomes the OFF state, and the semiconductor switching elements 71 to 74 are controlled to OFF. The error control in step S42 is a process to deal with an abnormal state determined in step S21, step S22, step S28, or step S40.

Figure 18:
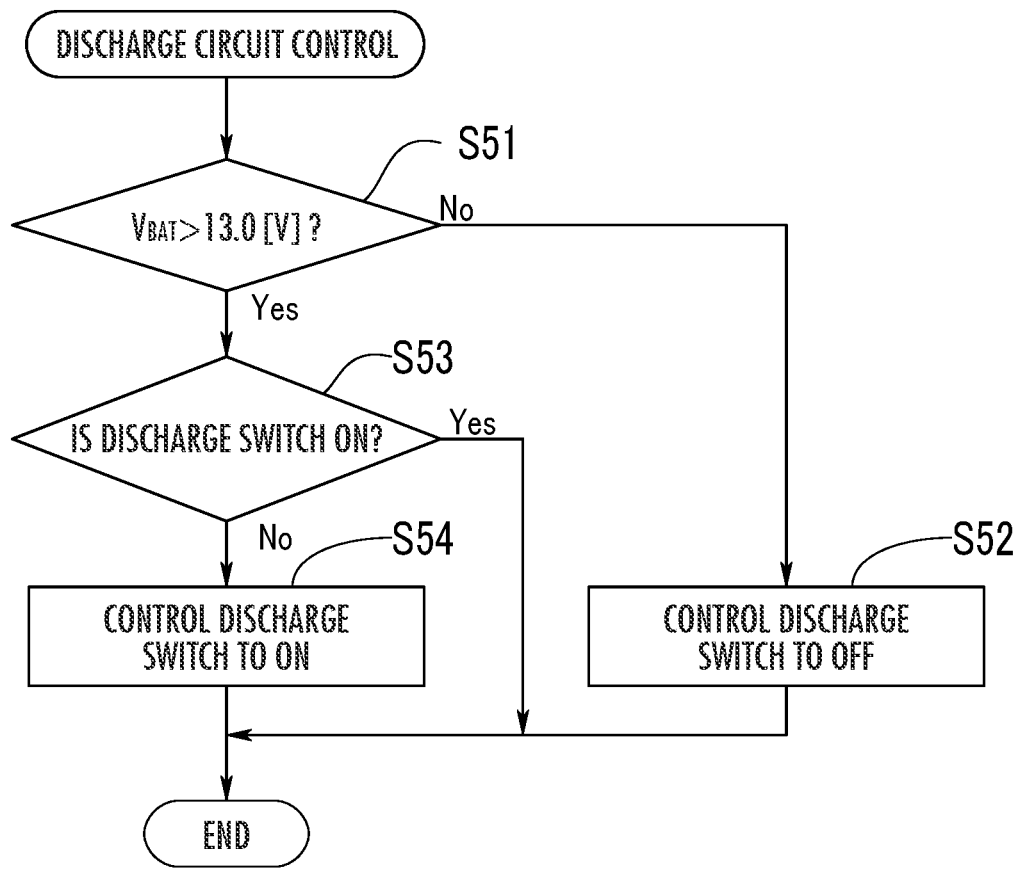
FIG. 18 is a flowchart illustrating discharging circuit control during the control operation of the sub-control unit in FIG. 9.

As illustrated in FIG. 18, in the discharging circuit control of step S17, the sub-control unit 62 determines whether or not the output voltage VBAT of the built-in battery 16 is higher than 13.0 [V] (step S51). When VBAT≤13.0 [V], the built-in battery 16 does not need to be discharged because it is not overcharged. Therefore, when VBAT≤13.0 [V], the sub-control unit 62 controls the discharge switch 64 to OFF (step S52). On the other hand, when VBAT>13.0 [V], the built-in battery 16 needs to be discharged because it is overcharged. Therefore, when VBAT>13.0 [V], the sub-control unit 62 determines whether or not the discharge switch 64 is in the ON state (step S53). When the discharge switch 64 is not in the ON state, the sub-control unit 62 controls the discharge switch 64 to ON (step S54). Since the discharging current from the built-in battery 16 flows through the resistor 65 and the discharge switch 64 by turning on the discharge switch 64, the output voltage VBAT of the built-in battery 16 is forced to drop.

Figure 19:
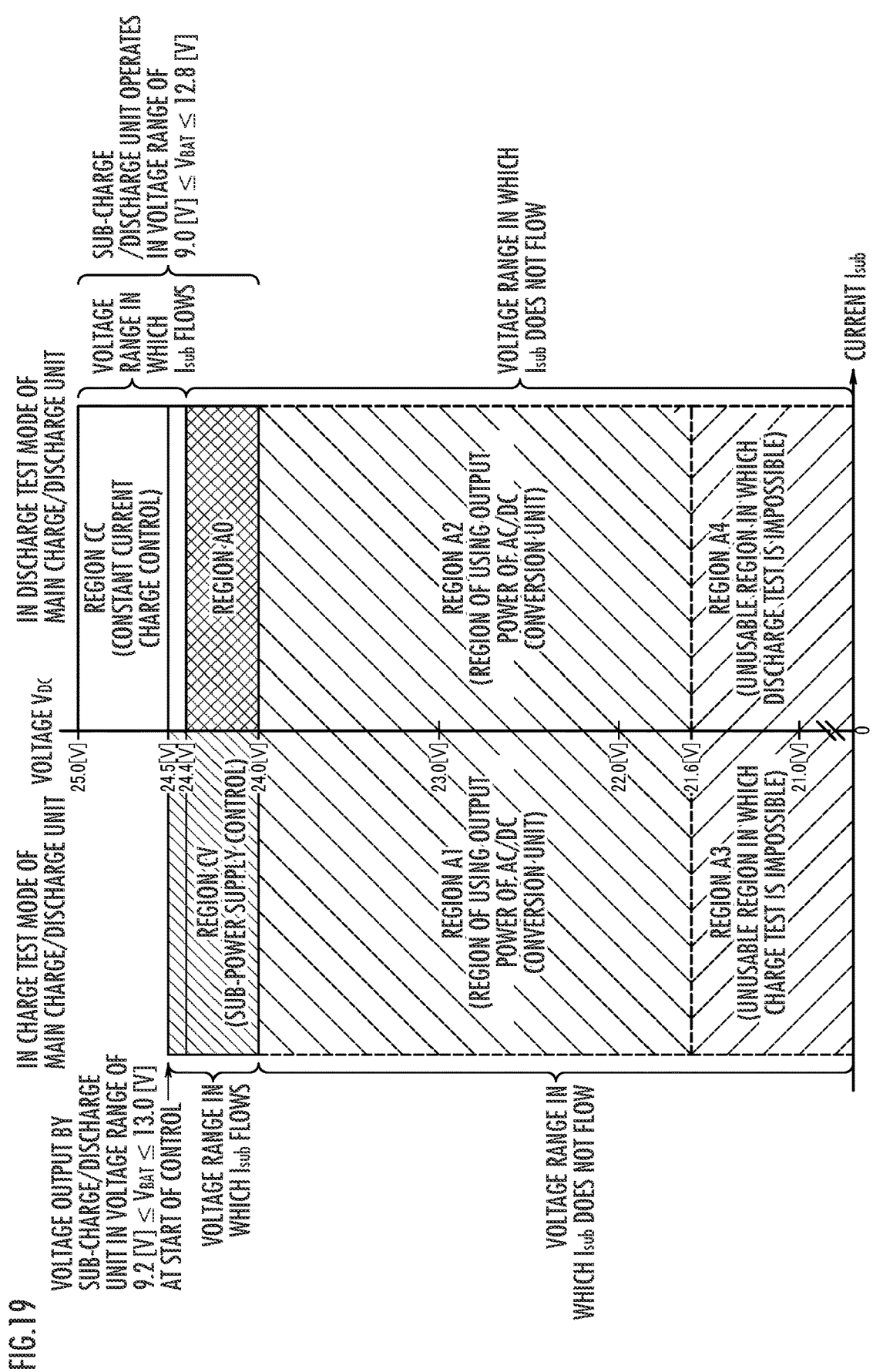
FIG. 19 is a diagram illustrating a voltage range of bus line voltages when each of constant current charge control and sub-power supply control is executed during gate control.

FIG. 19 illustrates a voltage range of the bus line voltage VDC when each of the constant current charge control and the sub-power supply control is executed.

As mentioned above, when the main charge/discharge unit 11 is in the discharge test mode, the bus line voltage VDC becomes higher than 24.0 [V] as the output DC voltage of the AC/DC conversion unit 21 by the regenerative voltage generated between the terminals 23A and 23B of the main DC/DC conversion unit 23. The constant current charge control is started when the output voltage VBAT of the built-in battery 16 is in a chargeable voltage range of 9.0 [V]≤VBAT≤12.8 [V] and satisfying VDC>24.5 [V]. After the start of the constant current charge control, the bus line voltage VDC drops by charging the built-in battery 16, and when the bus line voltage VDC becomes 24.4 [V] or less, the constant current charge control is stopped. Further, when the bus line voltage VDC is higher than 25.0 [V], the constant current charge control is stopped as a test abnormality of the battery 15. Thus, a region CC illustrated in FIG. 19 is an execution range of the constant current charge control, that is, a region in which the built-in battery 16 is charged by using, as a power supply, the regenerative power from the main DC/DC conversion unit 23.

Thus, the built-in battery 16 can be charged by using the regenerative power generated in the main DC/DC conversion unit 23 in the discharge test mode of the main charge/discharge unit 11 by executing the constant current charge control without the need to convert the regenerative power to heat so as to waste the regenerative power. Further, during the constant current charge control, since the current Isub supplied to the built-in battery 16 in such a manner that the bus line voltage VDC falls in a range of 24.4<VDC≤25.0 [V] is controlled to a set constant current value, the built-in battery 16 can be charged stably.

As mentioned above, the sub-power supply control is started when the main charge/discharge unit 11 is in the charge test mode, the bus line voltage VDC is in the range of 21.6 [V]≤VDC≤25.0 [V], and the output voltage VBAT of the built-in battery 16 is in a voltage range of 9.2 [V]≤VBAT≤13.0 [V] in which power can be supplied. In the sub-power supply control, the sub-DC/DC conversion unit 51 is duty-ratio controlled in such a manner that the bus line voltage VDC becomes the constant voltage of 24.5 [V]. In the sub-power supply control, the bus line voltage VDC may also be controlled in a range of 24.5 [V]±0.1 [V] including a tolerance of ±0.1 [V].

After the start of the sub-power supply control, when the bus line voltage VDC rises like VDC>24.5 [V], since there is a possibility that the main charge/discharge unit 11 will be in the discharge test mode in which regenerative power is generated from the main DC/DC conversion unit 23, the sub-power supply control is stopped immediately.

Further, after the start of the sub-power supply control, when the output voltage VBAT of the built-in battery 16 becomes lower than 10.0 [V] due to the discharge of the built-in battery 16, the constant voltage output of the sub-DC/DC conversion unit 51 is gradually decreased by 0.1 [V] from 24.5 [V], and when it becomes VDC≤24.0 [V], the sub-power supply control is stopped. The reason why the sub-power supply control is stopped immediately when the bus line voltage VDC drops below 24.5 [V] is because the voltage fluctuation of the bus line voltage VDC becomes too large to affect the operation of the main DC/DC conversion unit 23. In order to avoid this, control to gradually decrease the bus line voltage VDC from 24.5 [V] to 24.0 [V] when stopping the sub-power supply control is performed. Therefore, a region CV illustrated in FIG. 19 is an execution range of the sub-power supply control, that is, a region in which power is supplied from the sub-DC/DC conversion unit 51 to the main DC/DC conversion unit 23.

Thus, power stored in the built-in battery 16 can be reused as a charging power supply in the charge test mode of the main charge/discharge unit 11 by executing the sub-power supply control. Further, in the sub-power supply control, since the bus line voltage VDC is controlled to 24.5 [V] higher than 24 [V] as the output voltage of the AC/DC conversion unit 21, power can be supplied from the sub-charge/discharge unit 12 to the main DC/DC conversion unit 23 reliably.

Note that in a region AO as a voltage range of 24.0 [V]≤VDC≤24.4 [V] when the main charge/discharge unit 11 is in the discharge test mode, the sub-charge/discharge unit 12 is neither in the charge mode nor the discharge mode, and no current ISUB flows. In this case, discharge power and internal power consumption are balanced in the main charge/discharge unit 11.

Further, a voltage range of 21.6 [V]≤VDC≤24.0 [V] when the main charge/discharge unit 11 is in the discharge test mode or the charge test mode is in an operating region A1 or A2 in which the output voltage of the AC/DC conversion unit 21 is applied to the main DC/DC conversion unit 23. In the operating region A2, even when the main charge/discharge unit 11 is in the discharge test mode, the built-in battery 16 cannot be charged because the terminals 23A and 23B of the main DC/DC conversion unit 23 are short-circuited or discharge power is low. Further, in the operating region A1, even when the main charge/discharge unit 11 is in the charge test mode, power cannot be supplied from the sub-charge/discharge unit 12 to the main DC/DC conversion unit 23 because the output voltage VBAT of the built-in battery 16 is low. Regions A3 and A4 in which the bus line voltage VDC is lower than 21.6 [V] are unusable regions in which the discharge test and the charge test of the main charge/discharge unit 11 are impossible.

In the above-mentioned example of the present invention, the diode 22 is provided between the AC/DC conversion unit 21 and the main DC/DC conversion unit 23 as a backflow prevention element between the bus lines L1 and L2, but a transistor may also be provided instead. For example, as illustrated in FIG. 20, an N-channel FET (Field Effect Transistor) 48 can be provided between the AC/DC conversion unit 21 and the main DC/DC conversion unit 23. To the gate of the FET 48, an ON/OFF signal is supplied from an unillustrated gate control unit. The FET 48 is controlled to OFF in the discharge test mode, and controlled to ON in the charge test mode. The gate control unit may also switch ON/OFF of the FET 48 according to the detection result of detecting the current flowing direction in each of the discharge test mode and the charge test mode. Thus, by providing the N-channel FET 48 instead of the diode 22, respective values of voltage drop and power loss by the FET 48 can be reduced compared with the voltage drop and power loss by the diode 22. For example, a voltage drop when a current 50 [A] is applied to the diode 22 is 0.61 [V], and the power loss is 0.61 [V]×50 [A]=30.5 [W]. In contrast, a voltage drop when the current 50 [A] is applied between the drain and source of the FET 48 with a drain-source resistance of 1.6 [mΩ] is 50 [A]×1.6 [mΩ]=0.08 [V], and the power loss is (50 [A])^2×1.6 [mΩ]=4 [W]. Thus, since use of the FET 48 can sufficiently reduce the voltage drop and the power loss, and this can suppress the heat dissipation in the FET 48, there is also an advantage that there is no need to provide a heatsink or a cooling fan for the FET 48.

Specific numerical values in the example mentioned above, such as the respective voltage values of the batteries 15 and 16, and the voltage value between the bus lines L1 and L2, are just examples in the present invention, and the present invention is not limited to these numerical values. In the present invention, these numerical values may of course be changed depending on the characteristics of each battery used, the charge/discharge conditions, and the like.

DESCRIPTION OF REFERENCE NUMERALS 11 main charge/discharge unit
12 sub-charge/discharge unit
14 AC power supply
15 test battery
16 built-in battery
21 AC/DC conversion unit
22 diode
23 main DC/DC conversion unit
25, 55 main switch
26, 57 sub-switch
27, 56, 65 resistor
28, 53, 59 fuse
29, 30, 52, 61 voltage detection unit
31 to 34, 71 to 74 semiconductor switching element
35, 75 full-bridge circuit
36, 37, 76, 77 choke coil
38, 39, 78, 79 capacitor
40, 80 current detection unit
41 to 44, 81 to 84 freewheeling diode
46 charge/discharge controller
47 test PC
48 N-channel FET
50 main control unit
51 sub-DC/DC conversion unit
58 simple discharge circuit
60 temperature sensor
62 sub-control unit
64 discharge switch
L1, L2 bus line

The invention claimed is:

1. A battery charge/discharge testing device comprising:
a DC power supply unit which outputs a constant DC voltage between two bus lines;
a main DC/DC conversion unit including a first full-bridge circuit composed of a plurality of switching elements and having two first input terminals and two first output terminals, where the two bus lines are connected to the two first input terminals, respectively, and a positive terminal and a negative terminal of a test battery are connected to the two first output terminals, respectively;
a main charge/discharge control unit which duty-ratio controls ON/OFF of each of the plurality of switching elements of the first full-bridge circuit in a first cycle to supply a charging current to the test battery through the first full-bridge circuit in a charge test mode so as to charge the test battery and to discharge stored charge of the test battery in a discharge test mode through the first full-bridge circuit so as to supply discharge power of the test battery between the two bus lines;
a sub-DC/DC conversion unit including a second full-bridge circuit composed of a plurality of switching elements and having two second input terminals and two second output terminals, where the two bus lines are connected to the two second input terminals, respectively, and a positive terminal and a negative terminal of a built-in battery are connected to the two second output terminals, respectively; and
a sub-charge/discharge control unit which duty-ratio controls ON/OFF of each of the plurality of switching elements of the second full-bridge circuit in a second cycle to perform charging and discharging of the built-in battery,
wherein:
when an output voltage of the built-in battery is in a voltage range capable of supplying power, the sub-charge/discharge control unit executes sub-power supply control to supply discharge power of the built-in battery between the two bus lines through the second full-bridge circuit by duty-ratio control of the second cycle so that the voltage between the bus lines becomes a first predetermined voltage value higher than a constant voltage value of the DC voltage, and when the voltage between the bus lines drops to the constant voltage value of the DC voltage or less during the execution of the sub-power supply control, the sub-charge/discharge control unit stops the sub-power supply control, or
when the voltage between the bus lines exceeds the first predetermined voltage value during the execution of the sub-power supply control, the sub-charge/discharge control unit stops the sub-power supply control and executes constant current charge control to charge the built-in battery through the second full-bridge circuit by using, as a power supply, discharge power of the test battery supplied between the two bus lines by the duty-ratio control of the second cycle, and when the voltage between the bus lines drops to a second predetermined voltage value or less during the execution of the constant current charge control, where the second predetermined voltage value is higher than the constant voltage value of the DC voltage and lower than the first predetermined voltage value, the sub-charge/discharge control unit stops the constant current charge control.

2. The battery charge/discharge testing device according to claim 1, wherein the sub-charge/discharge control unit determines whether or not the voltage between the bus lines drops repeatedly during the execution of the sub-power supply control, and when determining a drop in the voltage between the bus lines, the sub-charge/discharge control unit gradually decreases the first predetermined voltage value.

3. The battery charge/discharge testing device according to claim 1, wherein the sub-charge/discharge control unit determines whether or not the voltage between the bus lines drops repeatedly during the execution of the constant current charge control, and when determining a drop in the voltage between the bus lines, the sub-charge/discharge control unit reduces the charging current to the built-in battery, while when determining no drop in the voltage between the bus lines, the sub-charge/discharge control unit increases the charging current to the built-in battery.

4. The battery charge/discharge testing device according to claim 1, wherein when the voltage between the bus lines is such a low voltage that charge/discharge tests on the test battery are impossible or the voltage between the bus lines is an overvoltage, the sub-charge/discharge control unit stops control operation including the constant current charge control and the sub-power supply control.

5. The battery charge/discharge testing device according to claim 1, wherein:
the first full-bridge circuit is composed of a first switching element, a second switching element, a third switching element, and a fourth switching element,
one end of the first switching element and one end of the third switching element are connected to one of the two first input terminals, one end of the second switching element and one end of the fourth switching element are connected to the other of the two first input terminals, the other end of the first switching element and the other end of the second switching element are connected to one of the two first output terminals, the other end of the third switching element and the other end of the fourth switching element are connected to the other of the two first output terminals, one of the two first input terminals is connected to one of the two bus lines, and the other of the two first input terminals is connected to the other of the two bus lines, the two first output terminals are connected respectively to both terminals of the test battery through a first smoothing circuit including a first inductor and a first capacitor, the main charge/discharge control unit configures, in the first cycle, a first charging current period, a first commutation current period immediately after the first charging current period, a first discharging current period, and a second commutation current period immediately after the first discharging current period, in the first charging current period, the main charge/discharge control unit controls the first switching element and the fourth switching element to ON, and the second switching element and the third switching element to OFF to supply a charging current to the test battery, in the first commutation current period, the main charge/discharge control unit controls the first to fourth switching elements to OFF to cause a first commutation current to flow in a direction of the charging current by energy stored in the first inductor through respective freewheeling diodes of the second switching element and the third switching element, in the first discharging current period, the main charge/discharge control unit controls the first switching element and the fourth switching element to OFF, and controls the second switching element and the third switching element to ON to cause a discharging current to flow out of the test battery, in the second commutation current period, the main charge/discharge control unit controls the first to fourth switching elements to OFF to cause a second commutation current to flow in a direction of the discharging current by energy stored in the first inductor through respective freewheeling diodes of the first switching element and the fourth switching element, the main charge/discharge control unit performs duty-ratio control of the first cycle according to a ratio between the first charging current period and the first discharging current period, the second full-bridge circuit is composed of a fifth switching element, a sixth switching element, a seventh switching element, and an eighth switching element, one end of the fifth switching element and one end of the seventh switching element are connected to one of the two second input terminals, one end of the sixth switching element and one end of the eighth switching element are connected to the other of the two second input terminals, the other end of the fifth switching element and the other end of the sixth switching element are connected to one of the two second output terminals, the other end of the seventh switching element and the other end of the eighth switching element are connected to the other of the two second output terminals, one of the two second input terminals is connected to one of the two bus lines, and the other of the two second input terminals is connected to the other of the two bus lines, the two second output terminals are connected respectively to both terminals of the built-in battery through a second smoothing circuit including a second inductor and a second capacitor, the sub-charge/discharge control unit configures, in the second cycle, a second charging current period, a third commutation current period immediately after the second charging current period, a second discharging current period, and a fourth commutation current period immediately after the second discharging current period, in the second charging current period, the sub-charge/discharge control unit controls the fifth switching element and the eighth switching element to ON, and the sixth switching element and the seventh switching element to OFF to supply a charging current to the built-in battery, in the third commutation current period, the sub-charge/discharge control unit controls the fifth to eighth switching elements to OFF to cause a third commutation current to flow in a direction of the charging current to the built-in battery by energy stored in the second inductor through respective freewheeling diodes of the sixth switching element and the seventh switching element, in the second discharging current period, the sub-charge/discharge control unit controls the fifth switching element and the eighth switching element to OFF, and the sixth switching element and the seventh switching element to ON to cause a discharging current to flow out of the built-in battery, in the fourth commutation current period, the sub-charge/discharge control unit controls the fifth to eighth switching elements to OFF to cause a fourth commutation current to flow in a direction of the discharging current from the built-in battery by energy stored in the second inductor through respective freewheeling diodes of the fifth switching element and the eighth switching element, and duty-ratio control of the second cycle is performed by a ratio between the second charging current period and the second discharging current period.

6. The battery charge/discharge testing device according to claim 1, wherein a backflow prevention element is provided on either one of the two bus lines to block a current flow from the main DC/DC conversion unit and the sub-DC/DC conversion unit to the DC power supply unit.

7. A battery discharge power control method for a battery charge/discharge testing device including:

a DC power supply unit which outputs a constant DC voltage between two bus lines;

a main DC/DC conversion unit including a first full-bridge circuit composed of a plurality of switching elements and having two first input terminals and two first output terminals, where the two bus lines are connected to the two first input terminals, respectively, and a positive terminal and a negative terminal of a test battery are connected to the two first output terminals, respectively;

a main charge/discharge control unit which duty-ratio controls ON/OFF of each of the plurality of switching elements of the first full-bridge circuit in a first cycle to supply a charging current to the test battery through the first full-bridge circuit in a charge test mode so as to charge the test battery and to discharge stored charge of the test battery in a discharge test mode through the first full-bridge circuit so as to supply discharge power of the test battery between the two bus lines;

a sub-DC/DC conversion unit including a second full-bridge circuit composed of a plurality of switching elements and having two second input terminals and two second output terminals, where the two bus lines are connected to the two second input terminals, respectively, and a positive terminal and a negative terminal of a built-in battery are connected to the two second output terminals, respectively; and a sub-charge/discharge control unit which duty-ratio controls ON/OFF of each of the plurality of switching elements of the second full-bridge circuit in a second cycle to perform charging and discharging of the built-in battery, the battery discharge power control method comprising:

a step in which when an output voltage of the built-in battery is in a voltage range capable of supplying power, the sub-charge/discharge control unit executes sub-power supply control to supply discharge power of the built-in battery between the two bus lines through the second full-bridge circuit by duty-ratio control of the second cycle so that the voltage between the bus lines becomes a first predetermined voltage value higher than a constant voltage value of the DC voltage, and when the voltage between the bus lines drops to the constant voltage value of the DC voltage or less during the execution of the sub-power supply control, the sub-charge/discharge control unit stops the sub-power supply control; and a step in which when the voltage between the bus lines exceeds the first predetermined voltage value during the execution of the sub-power supply control, the sub-charge/discharge control unit stops the sub-power supply control and executes constant current charge control to charge the built-in battery through the second full-bridge circuit by using, as a power supply, discharge power of the test battery supplied between the two bus lines by the duty-ratio control of the second cycle, and when the voltage between the bus lines drops to a second predetermined voltage value or less during the execution of the constant current charge control, where the second predetermined voltage value is higher than the constant voltage value of the DC voltage and lower than the first predetermined voltage value, the sub-charge/discharge control unit stops the constant current charge control.

* * * * *